(12) United States Patent
Jung et al.

(10) Patent No.: US 11,689,827 B2
(45) Date of Patent: Jun. 27, 2023

(54) IMAGE SENSING DEVICE AND ELECTRONIC DEVICE COMPRISING THE SAME

(71) Applicant: Samsung Electronics Co., Ltd., Suwon-si (KR)

(72) Inventors: Hyun Yong Jung, Seoul (KR); Min Woong Seo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/564,581

(22) Filed: Dec. 29, 2021

(65) Prior Publication Data

US 2022/0124272 A1 Apr. 21, 2022

Related U.S. Application Data

(62) Division of application No. 17/162,423, filed on Jan. 29, 2021, now Pat. No. 11,343,459.

(30) Foreign Application Priority Data

Jun. 18, 2020 (KR) .......................... 10-2020-0074074

(51) Int. Cl.
*H04N 25/75* (2023.01)
*H04N 25/59* (2023.01)
(Continued)

(52) U.S. Cl.
CPC ............ *H04N 25/75* (2023.01); *H04N 25/59* (2023.01); *H04N 25/745* (2023.01); *H04N 25/778* (2023.01); *H04N 25/79* (2023.01)

(58) Field of Classification Search
CPC .. H04N 5/378; H04N 5/3559; H04N 5/37457; H04N 5/3765; H04N 5/379;
(Continued)

(56) References Cited

U.S. PATENT DOCUMENTS 9,247,170 B2 1/2016 Komori et al.
9,386,240 B1 7/2016 Johansson et al.
(Continued)

FOREIGN PATENT DOCUMENTS

KR 10-0763442 B1 10/2007
KR 10-0871056 B1 11/2008

OTHER PUBLICATIONS

Notice of Allowance dated Jan. 12, 2022, issued in corresponding U.S. Appl. No. 17/162,423.

*Primary Examiner* — Ahmed A Berhan
(74) *Attorney, Agent, or Firm* — Harness, Dickey & Pierce, P.L.C.

(57) ABSTRACT

An image sensing device includes a pixel circuit, a readout circuit, and a row driver. The pixel circuit is configured to output a pixel signal in response to a selection signal. The readout circuit is configured to output a digital signal corresponding to the pixel signal, generate a gain control signal based on a first pixel signal received from the pixel circuit, provide the gain control signal to the pixel circuit, receive a second pixel signal output by the pixel circuit using the gain control signal, and output a digital signal corresponding to the second pixel signal. The row driver is configured to provide the selection signal to the pixel circuit while maintaining the selection signal at a first level while the readout circuit provides the gain control signal to the pixel circuit and the pixel circuit outputs the second pixel signal to the readout circuit.

13 Claims, 16 Drawing Sheets

(51) Int. Cl.
*H04N 25/71* (2023.01)
*H04N 25/79* (2023.01)
*H04N 25/778* (2023.01)

(58) Field of Classification Search
CPC ...... H04N 25/75; H04N 25/59; H04N 25/745; H04N 25/778; H04N 25/79
See application file for complete search history.

(56) References Cited

U.S. PATENT DOCUMENTS

| | | | |
|---|---|---|---|
| 9,544,518 B2 | 1/2017 | Awatani et al. | |
| 10,142,559 B2 | 11/2018 | Kim | |
| 10,250,826 B2 | 4/2019 | Mandelli et al. | |
| 10,510,796 B1 * | 12/2019 | Wang | H01L 27/14636 |
| 10,559,614 B2 | 2/2020 | Oh | |
| 10,721,427 B2 | 7/2020 | Liu | |
| 2004/0251394 A1 * | 12/2004 | Rhodes | H04N 5/35572 |
| | | | 348/E3.019 |
| 2007/0035649 A1 * | 2/2007 | McKee | H01L 27/14654 |
| | | | 348/E3.018 |
| 2019/0098235 A1 | 3/2019 | Gilhotra et al. | |
| 2019/0253067 A1 | 8/2019 | Sakai | |

* cited by examiner

| R | R | Gr | Gr |
|---|---|----|----|
| R | R | Gr | Gr |
| Gb | Gb | B | B |
| Gb | Gb | B | B |

IMAGE SENSING DEVICE AND ELECTRONIC DEVICE COMPRISING THE SAME

This application is a divisional of U.S. application Ser. No. 17/162,423, filed Jan. 29, 2021, which claims priority from Korean Patent Application No. 10-2020-0074074, filed on Jun. 18, 2020 in the Korean Intellectual Property Office, the disclosure of each of which is incorporated herein by reference in its entirety.

BACKGROUND

1. Technical Field

The present disclosure relates to an image sensing device and/or an electronic device including the same.

2. Description of Related Art

An image sensing device may include semiconductor elements that convert optical information into an electric signal. Such an image sensing device may include a charge coupled device (CCD) image sensing device and a complementary metal-oxide semiconductor (CMOS) image sensing device.

The CMOS image sensor may be abbreviated as a CIS (CMOS image sensor). The CIS may include a plurality of pixels arranged in a two-dimensional manner Each of the pixels may include, for example, a photodiode (PD). The photodiode may serve to convert the incident light into an electric signal.

Recently, with the development of a computer industry and a communication industry, demands for image sensors having improved performance have increased in various fields such as to provide a digital camera, a video camera, a smartphone, a game console, a security camera, a medical micro camera, and a robot. Further, as the semiconductor devices have become highly integrated, the image sensors have also become highly integrated.

SUMMARY

Aspects of the present disclosure provide an image sensing device capable of operating at a high speed.

Aspects of the present disclosure also provide an electronic device capable of performing a high-speed image sensing operation.

According to an embodiment, an image sensing device may include a pixel circuit including a floating diffusion, a photoelectric element, a drive transistor, a DCG (Dual Conversion Gain) transistor, a selection transistor, and a column line connected to the selection transistor. The floating diffusion may be a region of the pixel circuit. The floating diffusion may be configured to store electric charge generated by the photoelectric element. The drive transistor may be configured to generate a pixel signal on the basis of the electric charge stored in the floating diffusion. The selection transistor may be configured to output the pixel signal generated by the drive transistor to the column line in response to the selection transistor receiving a selection signal. The selection transistor may be configured to output a first pixel signal to the column line based on the electric charge stored in the floating diffusion in a state in which the DCG transistor is turned off. The DCG transistor may be configured to change a capacitance of the floating diffusion in response to the DCG transistor receiving a gain control signal. The pixel circuit may be configured to perform an operation of the selection transistor outputting the first pixel signal to the column line while the DCG transistor receives the gain control signal and the selection transistor receives the selection signal maintained at a first level.

According to an embodiment, an image sensing device may include a pixel circuit, a readout circuit, and a row driver. The pixel circuit may be configured to output a pixel signal in response to a selection signal. The readout circuit may be configured to output a digital signal corresponding to the pixel signal provided from the pixel circuit. The readout circuit may be configured to receive a first pixel signal from the pixel circuit, generate a gain control signal based on the first pixel signal, and provide the gain control signal to the pixel circuit. The readout circuit may be configured to receive a second pixel signal output by the pixel circuit using the gain control signal, and output a digital signal corresponding to the second pixel signal. The row driver may be configured to provide the selection signal to the pixel circuit while maintaining the selection signal at a first level during an operation in which the readout circuit provides the gain control signal to the pixel circuit and an operation in which the pixel circuit outputs the second pixel signal to the readout circuit are performed.

According to an embodiment, an image sensing device may include a pixel circuit, a row driver, a ramp signal generator, and a readout circuit. The pixel circuit may be configured to output a pixel signal in response to a selection signal. The row driver may be configured to generate the selection signal and provide the selection signal to the pixel circuit. The ramp signal generator may be configured to generate a ramp signal. The readout circuit may be configured to receive the pixel signal from the pixel circuit, compare the pixel signal with the ramp signal provided from the ramp signal generator, and output a digital signal corresponding to the pixel signal. The ramp signal generator may be configured to provide the ramp signal to the readout circuit. The ramp signal may include a first pulse which drops from a reference voltage by a first level, a second pulse which drops from the reference voltage by a second level different from the first level, and a third pulse which drops from the reference voltage by a third level different from the second level. The ramp signal generator may be configured to provide the first pulse, the second pulse, and the third pulse to the readout circuit while the row driver provides the selection signal to the pixel circuit and maintains the selection signal at a first level.

According to an embodiment, an electronic device may include an image sensor and a processor The image sensor may include a plurality of sensing units and the image sensor may be configured to output an image signal based on light sensed by the plurality of sensing units. The image signal may include conversion gain information for each of the plurality of sensing units. The processor may be configured to receive the image signal from the image sensor and perform image processing on the image signal using the conversion gain information for each plurality of sensing units included in the image signal.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail example embodiments thereof with reference to the attached drawings, in which:

FIG. 13 is an example diagram for explaining a pixel array of an image sensing device according to example embodiments;

DETAILED DESCRIPTION OF EXAMPLE EMBODIMENTS

Hereinafter, example embodiments according to inventive concepts will be described with reference to the accompanying drawings.

Figure 1:
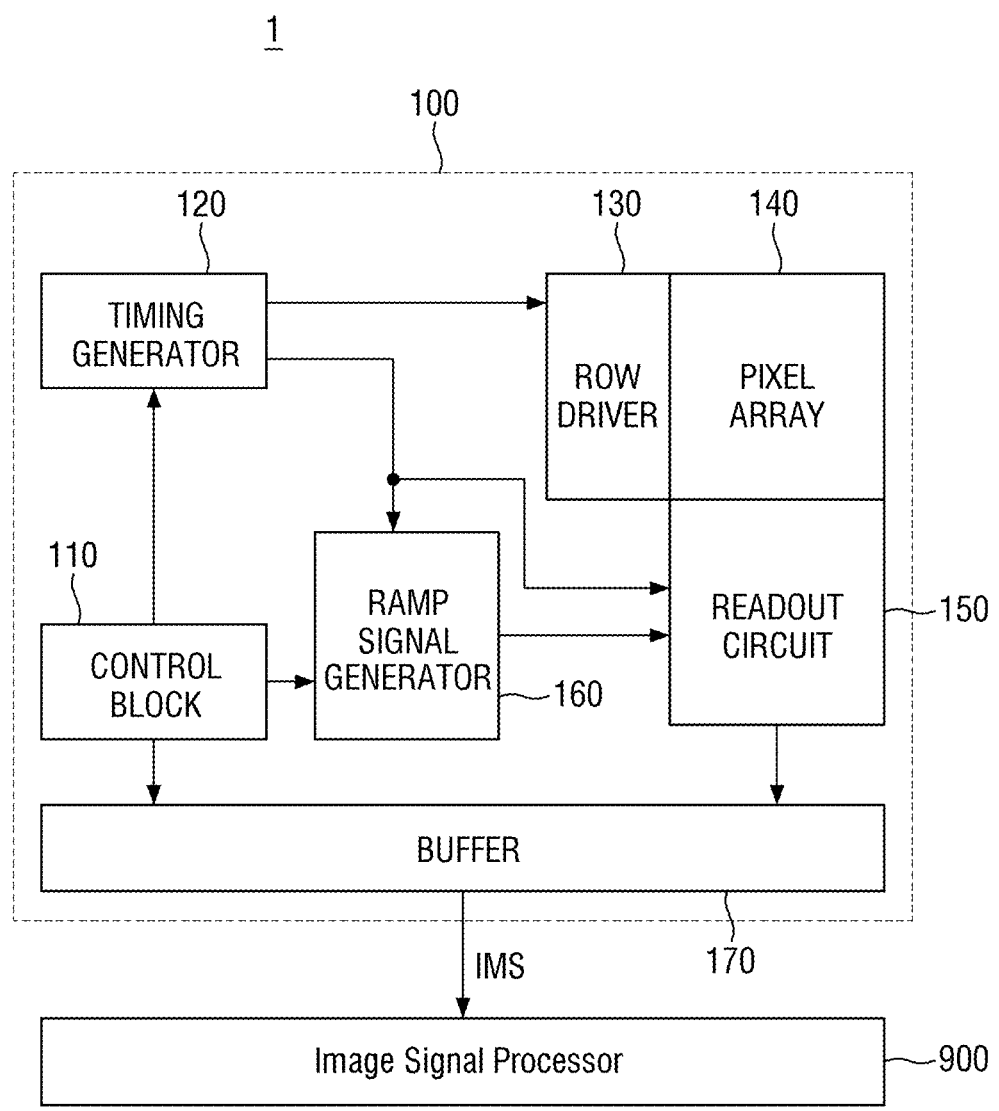
FIG. 1 is a block diagram of an image sensing device according to some example embodiments.

FIG. 1 is a block diagram of an image sensing device according to some example embodiments.

Referring to FIG. 1, the image sensing device 1 may include an image sensor 100 and an image processor 900.

The image sensor 100 may generate an image signal IMS, by sensing an image of a sensing target, using light. In some example embodiments, the generated image signal IMS may be, for example, a digital signal, but example embodiments are not limited thereto.

The image signal IMS may be provided to the image processor 900 and processed therein. The image processor 900 receives the image signal IMS that is output from the buffer 170 of the image sensor 100, and may process the received image signal IMS to be easily displayed.

In some example embodiments, the image processor 900 may perform digital binning on the image signal IMS that is output from the image sensor 100. At this time, the image signal IMS that is output from the image sensor 100 may be a raw image signal from a pixel array 140 without analog binning, and may also be an image signal IMS on which the analog binning has already been performed.

In some example embodiments, the image sensor 100 and the image processor 900 may be placed separately from each other, as shown. For example, the image sensor 100 is mounted on a first chip, the image processor 900 is mounted on a second chip, and they may communicate with each other through a predetermined or alternatively, desired interface. However, example embodiments are not limited thereto, and the image sensor 100 and the image processor 900 may be implemented as a single package, for example, an MCP (multi-chip package).

The image sensor 100 may include a control register block 110, a timing generator 120, a row driver 130, a pixel array 140, a readout circuit 150, a ramp signal generator 160, and a buffer 170.

The control register block 110 may generally control the operation of the image sensor 100. In particular, the control register block 110 may directly transmit the operation signal to the timing generator 120, the ramp signal generator 160 and the buffer 170.

The timing generator 120 may generate a signal that serves as a reference for operation timing of various components of the image sensor 100. The operation timing reference signal generated by the timing generator 120 may be transmitted to the row driver 130, the readout circuit 150, the ramp signal generator 160, and the like.

The ramp signal generator 160 may generate and transmit a ramp signal used in the readout circuit 150. For example, the readout circuit 150 may include a correlated dual sampler (CDS), a comparator, etc., and the ramp signal generator 160 may generate and transmit a ramp signal used in the correlated dual sampler (CDS), the comparator, etc.

The buffer 170 may include, for example, a latch unit. The buffer 170 may temporarily store an image signal IMS to be provided to the outside, and may transmit the image signal IMS to an external memory or an external device.

The pixel array 140 may sense an external image. The pixel array 140 may include a plurality of pixels (or unit pixels). The row driver 130 may selectively activate a row of the pixel array 140.

The readout circuit 150 samples the pixel signal provided from the pixel array 140, compares the pixel signal with a ramp signal, and then may convert the analog image signal (data) into a digital image signal (data) on the basis of the comparison result.

Figure 2:
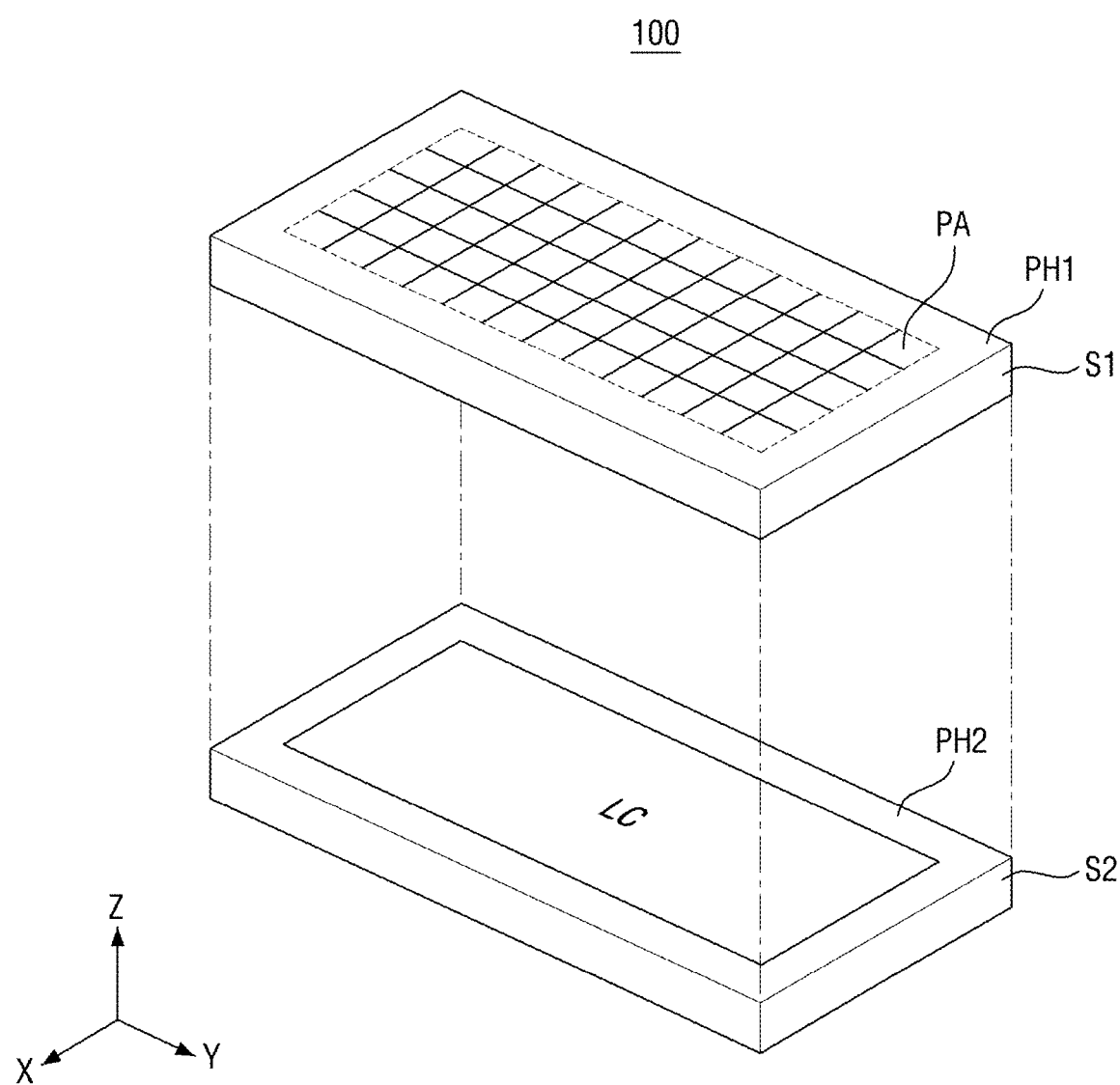
FIG. 2 is a diagram showing a conceptual layout of the image sensor of FIG. 1.

FIG. 2 is a diagram showing a conceptual layout of the image sensor of FIG. 1.

Referring to FIG. 2, the image sensor 100 may include first and second regions S1 and S2 stacked in a first direction Z (for example, a vertical direction). The first and second regions S1 and S2 may extend in a second direction X and a third direction Y as shown, and the blocks shown in FIG. 1 may be placed in the first and second regions S1 and S2. The first and second regions S1 and S2 may be regions included in a semiconductor substrate such as a silicon substrate, which may further include an underlying organic plastic substrate, but is not limited thereto.

Although not shown in the drawing, a third region in which a memory is placed may be placed below the second region S2. At this time, the memory placed in the third region receives the image data from the first and second regions S1 and S2, stores or processes the image data, and may retransmit the image data to the first and second regions S1 and S2. At this time, the memory may include a memory element such as a DRAM (dynamic random access memory) element, an SRAM (static random access memory) element, an STT-MRAM (spin transfer torque magnetic random access memory) element and a flash memory element. When the memory includes, for example, a DRAM element, it is possible to receive and process the image data at a relatively high speed. Also, in some example embodiments, the memory may be placed in the second region S2.

The first region S1 may include a pixel array region PA and a first peripheral region PH1, and the second region S2 may include a logic circuit region LC and a second peripheral region PH2. The first and second regions S1 and S2 may be sequentially vertically stacked and placed.

In the first region S1, the pixel array region PA may be a region in which the pixel array (140 of FIG. 1) described with reference to FIG. 1 is placed. The pixel array region PA may include a plurality of unit pixels (PX(i,j) of FIG. 3) arranged in a matrix form. Each pixel may include photodiodes and transistors. A more specific description thereof will be provided later.

The first peripheral region PH1 may include a plurality of pads and may be placed around the pixel array region PA. The plurality of pads may transmit and receive electrical signals to and from an external device or the like.

In the second region S2, the logic circuit region LC may include electronic elements including a plurality of transistors. The electronic elements included in the logic circuit region LC may be electrically connected to the pixel array region PA to provide a constant signal to each unit pixel PX of the pixel array region PA or control the output signal.

For example, the control register block 110, the timing generator 120, the row driver 130, the readout circuit 150, the ramp signal generator 160, the buffer 170, and the like described above with reference to FIG. 1 may be placed in the logic circuit region LC. For example, blocks other than the pixel array 140 in the blocks of FIG. 1 may be placed in the logic circuit region LC.

The second peripheral region PH2 may also be placed in a region of the first region S1 corresponding to the first peripheral region PH1, but example embodiments are not limited thereto.

Figure 3:
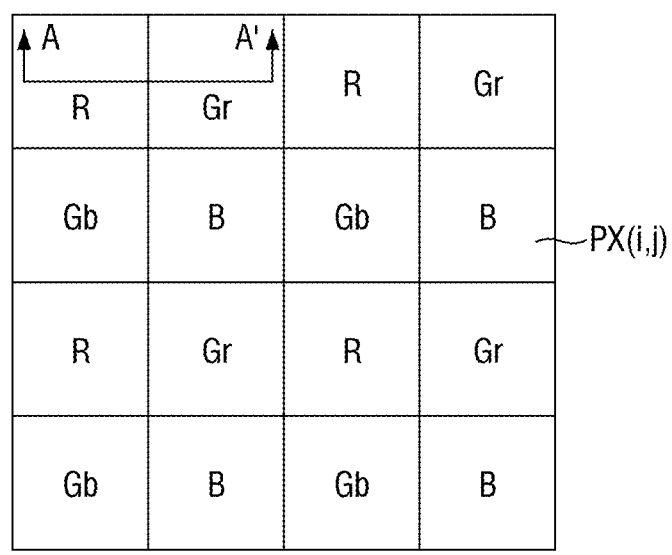
FIG. 3 is an example diagram for explaining a pixel array of FIG. 1.

FIG. 3 is an example diagram for explaining the pixel array of FIG. 1.

Referring to FIG. 3, the pixels PX(i,j) of the pixel array 140 may be arranged, for example, in a Bayer pattern. However, example embodiments are not limited thereto, and the pixels PX(i,j) may also be arranged in, for example, a tetra pattern or a nona pattern.

In FIG. 3, although only sixteen filters of four rows and four columns are shown to explain the Bayer pattern, this shows only some filter regions for the sake of explanation, and example embodiments are not limited thereto. That is, the number of filters of the Bayer pattern may be modified and implemented as many times as desired.

The Bayer pattern may include filters of three colors of Red, Green, and Blue. An R filter (R) is an optical filter that transmits only red, G filters (Gr and Gb) are optical filters that transmit only green, and a B filter (B) is an optical filter that transmits only blue. As the Bayer pattern, as shown in FIG. 3, each of the R, G, and B filters (R, Gb, Gr, and B) may be placed while having a constant pattern. Depending on the human visual characteristics, the G filter may include a Gr filter (Gr) located next to the R filter (R) and a GB filter (Gb) located next to the B filter (B), as shown in FIG. 3.

As shown, the Bayer pattern may be formed by forming a region in which each color filter (for example, R, Gr, Gb, or B) is formed in a 1×1 matrix.

Figure 4:
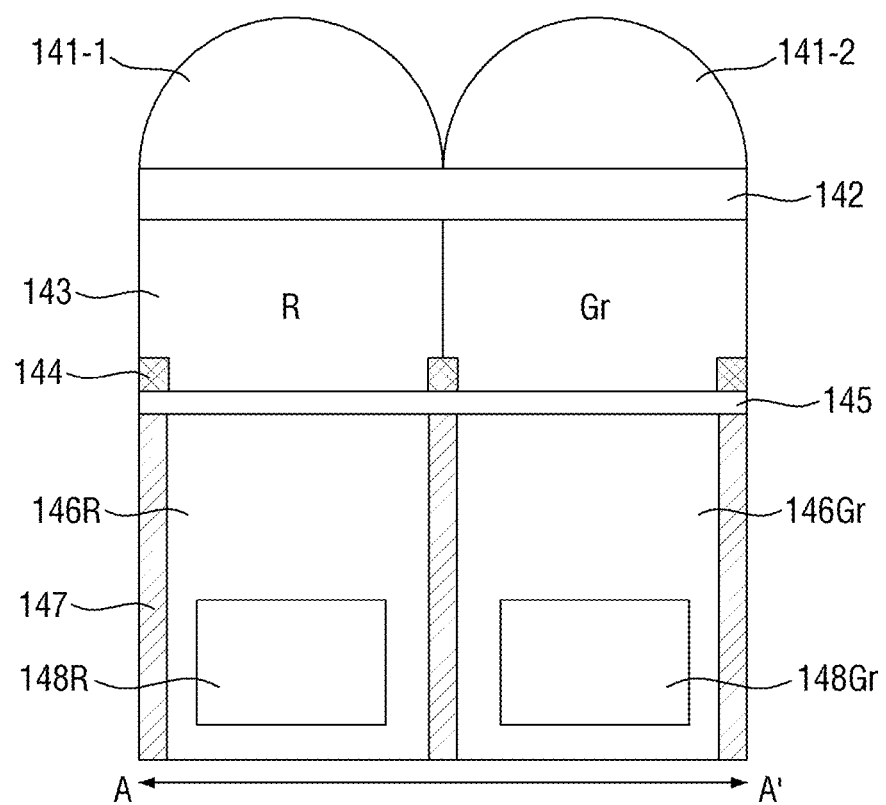
FIG. 4 is a cross-sectional view taken along a line A-A' of FIG. 3.

FIG. 4 is a cross-sectional view taken along a line A-A' of FIG. 3.

Referring to FIG. 4, the image sensor includes substrates 146R and 146Gr, photoelectric transistors 148R and 148Gr, an antireflection film 147, a side antireflection film 144, color filters 143, an upper planarization film 142, a lower planarization film 145, and microlenses 141-1 and 141-2. The color filters 143 may include a red color filter R for selectively transmitting light in a red wavelength region and a green color filter Gr for selectively transmitting light in a green wavelength region, but example embodiments are not limited thereto. The color filters 143 may be formed of photosensitive resins or other suitable color filter materials.

As the substrates 146R and 146Gr, for example, a P-type or N-type bulk substrate may be used, a P-type or N-type epitaxial layer may be used by being grown on the P-type bulk substrate, or a P-type or N-type epitaxial layer may be used by being grown on the N-type bulk substrate. Further, as the substrates 146R and 146Gr, a substrate such as an organic plastic substrate may also be used in addition to the semiconductor substrate.

The photoelectric transistors 148R and 148Gr may be a photodiode, a phototransistor, a photogate, a pinned photodiode or a combination thereof. Hereinafter, a photodiode will be described as an example of the photoelectric element, but example embodiments are not limited thereto.

The antireflection film 147 and the side antireflection film 144 may reduce or prevent light, which enters the microlenses 141-1 and 141-2 from the outside, from penetrating the region R and the region Gr. Although the antireflection film 147 and the side antireflection film 144 may be made of an insulating film such as a silicon oxide film, a silicon nitride film, a silicon oxynitride film, a resin and a combination thereof, or a laminate thereof, example embodiments are not limited thereto.

The upper planarization film 142 and the lower planarization film 145 may be formed flat with the color filters R and Gr interposed therebetween. Although the upper planarization film 142 and the lower planarization film 145 may include at least one of a silicon oxide film-based material, a silicon nitride film-based material, a resin, or a combination thereof, example embodiments are not limited thereto.

Figure 5:
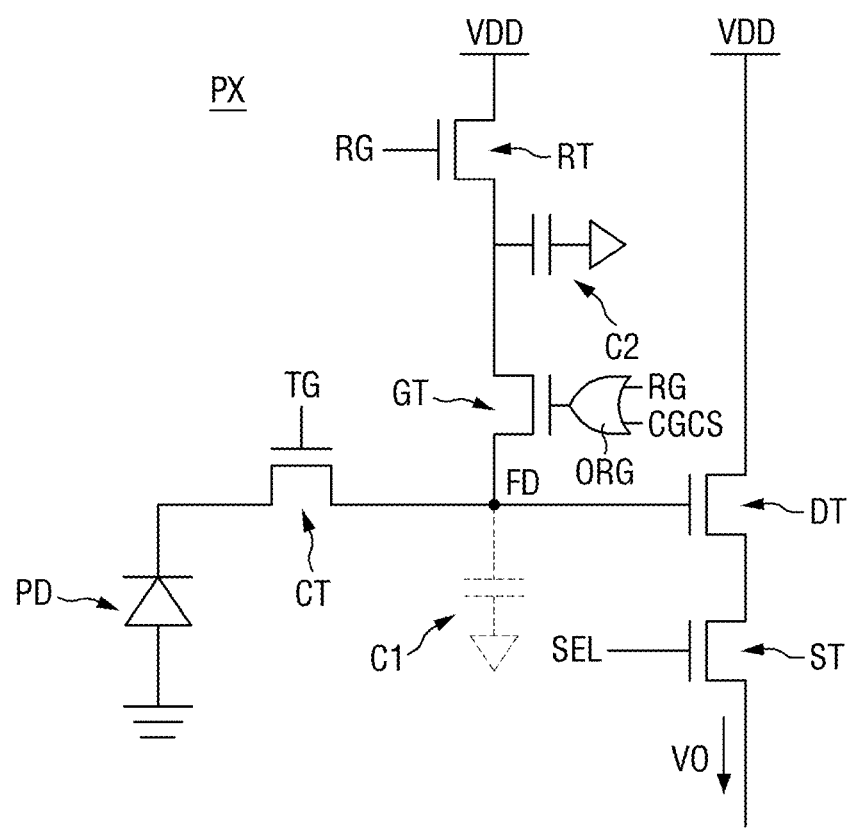
FIG. 5 is a unit pixel circuit diagram included in the pixel array of FIG. 1.

FIG. 5 is a unit pixel circuit diagram included in the pixel array of FIG. 1.

Referring to FIG. 5, the pixel PX may include a photoelectric element PD, a charge transfer transistor CT, a reset transistor RT, a floating diffusion FD, a drive transistor DT, a selection transistor ST and a DCG (Dual Conversion Gain) transistor GT. The features of the pixel PX may be formed in a semiconductor substrate, such as a silicon substrate.

The photoelectric element PD may generate an electric charge by sensing an external image (or light). A cathode of the photoelectric element PD may be connected to the floating node of the floating diffusion FD through the electric charge transfer transistor CT, and an anode of the photoelectric element PD may be grounded.

Although the photoelectric element PD may be, for example, a photodiode, a phototransistor, a photogate, a pinned photodiode, or a combination thereof, example embodiments are not limited thereto.

In some implementations, the photoelectric element PD may include an organic photo diode.

When the photoelectric element PD is an organic photodiode, the photoelectric element PD may include first and second electrodes placed to be parallel with each other, and an organic light conversion layer provided therebetween. The organic light conversion layer may receive light of a predetermined or alternatively, desired wavelength band to generate electric charge.

The electric charge transfer transistor CT is turned on by, for example, a transmission signal TG provided by the row driver (130 of FIG. 1), and may transfer the electric charge generated by the photoelectric element PD to the floating diffusion FD.

The floating diffusion FD may serve as a kind of capacitor C1 having a predetermined or alternatively, desired capacitance, and may store the electric charge generated by the photoelectric element PD.

A gate terminal of the drive transistor DT may be connected to the floating diffusion FD. The drive transistor DT may operate as a source follower buffer amplifier by the electric charge stored in the floating diffusion FD. That is, the drive transistor DT may amplify the electric charge generated in the photoelectric element PD and transferred to the floating diffusion FD using the power supply voltage VDD, and may transfer the electric charge to the selection transistor ST.

The selection transistor ST may be turned on, for example, by the selection signal SEL provided by the row driver (130 of FIG. 1), and may perform switching and addressing operations. When the selection signal SEL is applied from the row driver (130 of FIG. 1), the pixel signal VO may be output to a column line connected to the selection transistor ST. Such a pixel signal VO may be detected by the readout circuit (150 of FIG. 1).

The reset transistor RT may be turned on, for example, by a reset signal RG that is input by the row driver (130 of FIG. 1). When the reset transistor RT is turned on by the reset signal RG, the floating diffusion FD and the capacitor C2 may be reset to the power supply voltage VDD.

The DCG transistor GT may be turned on by, for example, a gain control signal CGCS provided from the readout circuit (150 of FIG. 1). Specifically, the DCG transistor GT may be turned on by, for example, at least one of the reset signal RG provided from the row driver (130 of FIG. 1) and the gain control signal CGCS provided from the readout circuit (150 of FIG. 1). To this end, for example, the gate of the DCG transistor GT is connected to the output of the OR gate ORG, and the OR gate ORG may perform the OR calculation of the reset signal RG and the gain control signal CGCS to provide the OR calculation result to the gate of the DCG transistor GT.

When the DCG transistor GT is turned on, the floating diffusion FD may be reset to the power supply voltage VDD, and the capacitance of the floating diffusion FD may increase to the sum of the capacitance of the capacitor C1 and the capacitance of the capacitor C2. That is, when the DCG transistor GT is turned off, since the floating diffusion FD has the capacitance of the capacitor C1, the image sensor 100 generates the image signal in a high conversion gain mode. When the DCG transistor GT is turned on, since the capacitance of the floating diffusion FD increases by the capacitance of the capacitance C2, the image sensor 100 may generate the image signal in a low conversion gain mode.

In some example embodiments, although the ratio of the capacitance of the capacitor C1 to the capacitance of the capacitor C2 may be about 1:3, example embodiments are not limited thereto.

In some example embodiments, although the reset transistor RT and the drive transistor DT are shown as receiving the power supply voltage VDD, example embodiments are not limited thereto. If desired, the voltage provided to the reset transistor RT and the drive transistor DT may be modified to a different form than that shown. For example, in some example embodiments, a first voltage is provided to the reset transistor RT, and a second voltage different from the first voltage may be applied to the drive transistor DT.

Figure 6:
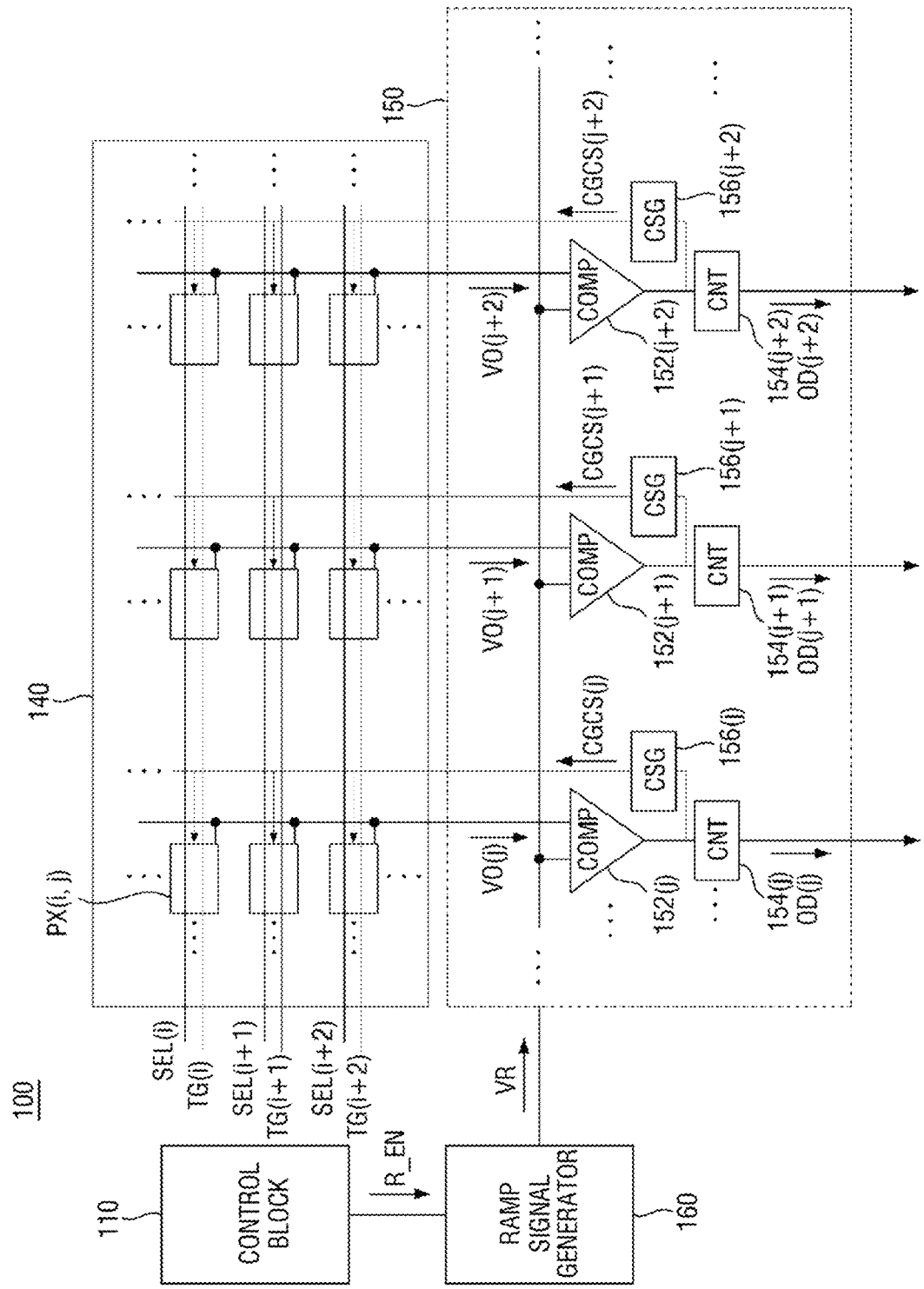
FIG. 6 is a block diagram showing the pixel array and a readout circuit of FIG. 1.

FIG. 6 is a block diagram showing the pixel array and the readout circuit of FIG. 1.

Referring to FIG. 6, the pixel array 140 may include a plurality of pixels PX(i,j). The plurality of pixels PX(i,j) may be arranged in a plurality of rows i and a plurality of columns j A row line may be placed for each of the plurality of rows i, and a column line may be placed for each of the plurality of columns j. Each pixel PX(i,j) may be selected by transmission signals TG(i), TG(i+1), and TG(i+2) and selection signals SEL(i), SEL(i+1), and SEL(i+2) to output pixel signals VO(j), VO(j+1), and VO(j+2).

The readout circuit 150 may include a plurality of comparators 152(*j*), 152(*j*+1), and 152(*j*+2), and a plurality of counters 154(*j*), 154(*j*+1), and 154(*j*+2) connected to a plurality of columns (j) of the pixel array 140. The readout circuit 150 may perform correlated double sampling and analog-to-digital conversion operations through, for example, the plurality of comparators 152(*j*), 152(*j*+1), and 152(*j*+2) and the plurality of counters 154(*j*), 154(*j*+1), and 154(*j*+2).

The ramp signal generator 160 may generate a ramp signal VR. The ramp signal VR is a signal for converting the pixel signals VO(j), VO(j+1), and VO(j+2) which are analog signals into digital signals OD(j), OD(j+1), and OD(j+2), and may have, for example, the shape of a triangle wave.

The ramp signal generator 160 may generate the ramp signal VR, for example, in response to a ramp enable signal R_EN generated in the control register block 110. In some example embodiments, although the ramp signal generator 160 may control the ramp signal VR, by generating a pulse according to a voltage drop on the ramp signal VR during a section in which the ramp enable signal R_EN is enabled, example embodiments are not limited thereto.

The ramp signal VR generated by the ramp signal generator 160 may be provided to the respective comparators 152(*j*), 152(*j*+1), and 152(*j*+2). Each of the comparators 152(*j*), 152(*j*+1), and 152(*j*+2) may be in a one-to-one correspondence with the column line (j) of one pixel PX(i,j).

The comparators 152(*j*), 152(*j*+1), and 152(*j*+2) may compare the ramp signal VR with the pixel signals VO(j), VO(j+1), and VO(j+2). Specifically, the comparators 152(*j*), 152(*j*+1), and 152(*j*+2) compare the ramp signal VR with the reset voltages of the pixel signals VO(j), VO(j+1), and VO(j+2), primarily compare the ramp signal VR with the signal voltages of the pixel signals VO(j), VO(j+1), and VO(j+2), and secondarily compare the ramp signal VR with the signal voltages of the pixel signals VO(j), VO(j+1), and VO(j+2). A detailed explanation thereof will be provided later.

In some example embodiments, the comparators 152(*j*), 152(*j*+1), 152(*j*+1) may compare the ramp signal VR with the pixel signals VO(j), VO(j+1), and VO(j+2), and output a comparison signal according to the result thereof. Such a comparison signal may represent which of the ramp signal VR and the pixel signals VO(j), VO(j+1), VO(j+2) is larger, by a binary signal. For example, when the ramp signal VR is large, the comparators output "1", and when the pixel signals VO(j), VO(j+1), and VO(j+2) are large, the comparators may output "0". Alternatively, it is also possible to configure the comparators to output in reverse.

Each of the counters 154(j), 154(j+1), and 154(j+2) may be in a one-to-one correspondence with the comparators 152(j), 152(j+1), and 152(j+2). That is, one comparison signal may be counted by one counter 154(j), 154(j+1), and 154(j+2). However, example embodiments are not limited thereto.

The counters 154(j), 154(j+1), and 154(j+2) may count, for example, how long the comparison signals output by the comparators 152(j), 152(j+1), and 152(j+2) maintain the same value, on the basis of a time point at which the ramp enable signal R_EN is enabled (or on the basis of a time point at which another counter signal is enabled). Further, the counters may output digital signals OD(j), OD(j+1), and OD(j+2) of the pixel signals VO(j), VO(j+1), and VO(j+2) that are analog signals, on the basis of the counting result thereof.

The control signal generators 156(j), 156(j+1), and 156(j+2) may generate gain control signals CGCS(j), CGCS(j+1), and CGCS(j+2), respectively. Specifically, the control signal generators 156(j), 156(j+1), and 156(j+2) may generate the gain control signals CGCS(j), CGCS(j+1), and CGCS(j+2), on the basis of the outputs of the comparators 152(j), 152(j+1), and 152(j+2). A more specific explanation thereof will be provided later.

The gain control signals CGCS(j), CGCS(j+1), and CGCS(j+2) generated from the control signal generators 156(j), 156(j+1), and 156(j+2) may be provided to a plurality of pixels PX(i,j) through the column line.

Although FIG. 6 shows a configuration in which the control signal generators 156(j), 156(j+1), and 156(j+2) generate the gain control signals CGCS(j), CGCS(j+1), and CGCS(j+2) on the basis of the output of the comparators 152(j), 152(j+1), and 152(j+2), example embodiments are not limited thereto. In some example embodiments, the control signal generators 156(j), 156(j+1), and 156(j+2) may generate the gain control signals CGCS(j), CGCS(j+1), and CGCS(j+2), on the basis of the outputs of the counters 154(j), 154(j+1), 154(j+2).

Hereinafter, the operation of the image sensing device according to some example embodiments will be described with reference to FIGS. 5 to 8.

Figure 7:
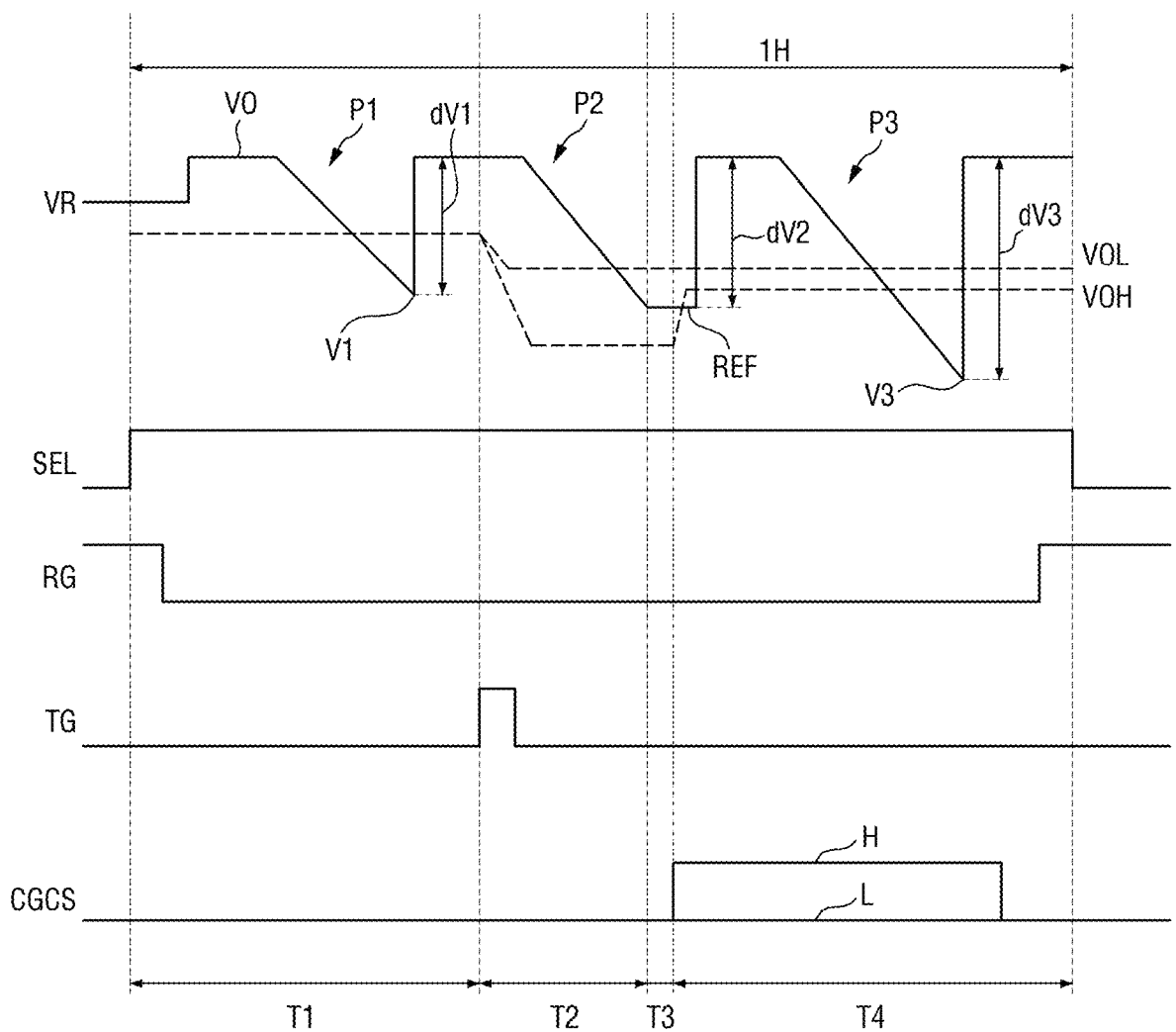
FIG. 7 is a timing diagram for explaining the operation of the image sensing device according to some example embodiments.
Figure 8:
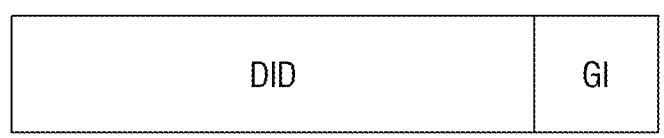
FIG. 8 is a diagram for explaining a structure of a digital signal that is output from the readout circuit of FIG. 6.

FIG. 7 is a timing diagram for explaining the operation of the image sensing device according to some example embodiments. FIG. 8 is a diagram for explaining the structure of a digital signal that is output from the readout circuit of FIG. 6.

The ramp signal VR shown in FIG. 7 is a signal which is provided to the comparator 152 during one sensing cycle 1H at which the selection signal SEL maintains a logic high level (hereinafter, a level H).

That is, the ramp signal generator 160 may provide the comparator 152 with the ramp signal VR to which a first pulse P1 that drops by a first level dV1 from the reference voltage to the ramp reset voltage V1, a second pulse P2 that drops by a second level dV2 from the reference voltage to the ramp reference voltage REF, and a third pulse P3 that drops by a third level dV3 from the reference voltage to the ramp signal voltage V3 are sequentially applied, during the one sensing cycle 1H at which the selection signal SEL maintains the level H.

Specifically, the ramp signal generator 160 sequentially generates the first pulse P1 having a first magnitude, the second pulse P2 having a second magnitude greater than the first magnitude, and a third pulse P3 having a third magnitude greater than the second magnitude with the ramp signal VR, in response to the ramp enable signal R_EN during one sensing cycle 1H, and may provide the pulses to the comparator 152.

Here, the ramp reference voltage REF may be determined between the ramp reset voltage V1 and the ramp signal voltage V3. That is, the second pulse P2 of the ramp signal VR may further drop more than the first level dV1 and less than the third level dV3 from the reference voltage.

In some example embodiments, although the ramp reference voltage REF may be determined as a saturation voltage of an analog-to-digital converter included in the readout circuit 150, example embodiments are not limited thereto.

Although the selection signal SEL, the reset signal RG, the transmission signal TG, and the like shown in FIG. 7 may be provided from, for example, the timing generator (120 of FIG. 1) controlled by the control register block (110 of FIG. 1), example embodiments are not limited thereto.

Referring to FIGS. 5 to 7, in the first section T1, the reset signal RG becomes the level H and the reset transistor RT is turned on. Since the reset signal RG of the level H is also provided to the OR gate ORG connected to the gate of the DCG transistor GT, the output of the OR gate ORG also becomes the level H. Therefore, the DCG transistor GT is also turned on.

Accordingly, the reset voltage is provided to the floating diffusion FD and the capacitor C2, and the floating diffusion FD and the capacitor C2 are reset. In some example embodiments, the reset voltage may be, for example, the power supply voltage VDD. Hereinafter, a case where the reset voltage is the power supply voltage VDD will be described as an example.

Next, when the reset signal RG transitions from the level H to the logic low level (hereinafter, a level L), the reset transistor RT and the DCG transistor GT are turned off. On the other hand, the drive transistor DT generates a pixel signal VO on the basis of the electric charge (electric charge that is reset by the power supply voltage VDD) stored in the floating diffusion FD, and since the selection transistor ST is turned on, the generated pixel signal VO is output to the readout circuit 150 along the column line.

The readout circuit 150 provided with the pixel signal VO compares the provided pixel signal VO with the first pulse P1, and converts the reset signal of the pixel PX into the digital signal OD.

Next, when the transmission signal TG transitions from the level L to the level H in the second section T2, the electric charge transfer transistor CT is turned on. When the electric charge transfer transistor CT is turned on, the electric charge generated by the photoelectric element PD is provided to the floating diffusion FD (or an amount of electric charge stored the floating diffusion FD is changed by the light incident on the photoelectric element PD).

The drive transistor DT generates a pixel signal VO on the basis of the electric charge (electric charge generated by the photoelectric element PD) stored in the floating diffusion FD, and since the selection transistor ST is turned on, the generated pixel signal VO is output to the readout circuit 150 along the column line.

If an optical power of the sensed image is low (for example, in a dark environment), the voltage level of the pixel signal VO changes to be lesser than that of the reset signal, like the low pixel signal VOL. However, if the optical power of the generated image is high (for example, in a bright environment), the voltage level of the pixel signal VO changes to be greater than the reset signal, like the high pixel signal VOH.

The low pixel signal VOL may preferably generate an image signal with a high conversion gain HCG without increasing the capacitance of the floating diffusion FD to maximize the sensing efficiency, and the high pixel signal VOH may preferably generate an image signal with a low conversion gain LCG by increasing the capacitance of the floating diffusion FD to maximize the sensing saturation level.

To determine this, the readout circuit 150 provided with the pixel signal VO may compare the provided pixel signal VO with the second pulse P2 to determine the signal level of the gain control signal CGCS.

After the second pulse P2 drops to the ramp reference voltage REF in the second section T2, the second pulse P2 maintains the ramp reference voltage REF in the third section T3.

At this time, the control signal generator 156 monitors the signal of the comparator 152 to determine whether the pixel signal VO provided from the pixel PX in the second section T2 is a low pixel signal VOL or a high pixel signal VOH.

For example, if the pixel signal VO provided from the pixel PX is a low pixel signal VOL, it is possible to know that the comparator 152 outputs 0 indicating a state in which the pixel signal VO is greater than the ramp signal VR, and the control signal generator 156 is provided with this and needs to generate an image signal with a high conversion gain in this sensing cycle 1H. Also, if the pixel signal VO provided from the pixel PX is a high pixel signal VOH, it is possible to know that the comparator 152 outputs 1 indicating a state in which the pixel signal VO is smaller than the ramp signal VR, and the control signal generator 156 is provided with this and needs to generate an image signal with a low conversion gain in this sensing cycle 1H.

Next, in the fourth section T4, the control signal generator 156 generates and outputs the gain control signal CGCS of level H or level L.

If the pixel signal VO provided from the pixel PX is a low pixel signal VOL, the control signal generator 156 outputs the gain control signal CGCS of level L so that the DCG transistor GT maintains the turned-off state. Since the reset signal RG maintains the level L in the fourth section T4, turning-on or turning-off of the DCG transistor GT is determined by the signal level of the gain control signal CGCS.

The drive transistor DT generates a pixel signal VO on the basis of the electric charge (electric charge generated by the photoelectric element PD) stored in the floating diffusion FD, and since the selection transistor ST is turned on, the generated pixel signal VO is output to the readout circuit 150 along the column line.

The readout circuit 150 provided with the pixel signal VO compares the provided pixel signal VO with the third pulse P3, and converts the image signal of the pixel PX into the digital signal OD.

Specifically, the comparator 152 compares the ramp signal VR with the pixel signal VO from a specific time point (for example, the time point at which the comparator 152 is enabled), and may output the comparison result to the counter 154 as a comparison signal. The counter 154 may count the comparison signal and convert the pixel signal VO into a digital signal OD.

On the contrary, if the pixel signal VO provided from the pixel PX is the high pixel signal VOH, the control signal generator 156 outputs the gain control signal CGCS of level H to turn on the DCG transistor GT. As a result, the capacitance of the floating diffusion FD increases due to the influence of the capacitor C2, and the signal level of the pixel signal VO may change according to the capacitance change of the floating diffusion FD.

The drive transistor DT generates a pixel signal VO on the basis of the electric charge (electric charge generated by the photoelectric element PD) stored in the floating diffusion FD, and since the selection transistor ST is turned on, the generated pixel signal VO is output to the readout circuit 150 along the column line.

The readout circuit 150 provided with the pixel signal VO compares the provided pixel signal VO with the third pulse P3, and converts the image signal of the pixel PX into the digital signal OD.

Specifically, the comparator 152 compares the ramp signal VR with the pixel signal VO from a specific time point (for example, a time point at which the comparator 152 is enabled), and may output the comparison result to the counter 154 as a comparison signal. The counter 154 may count the comparison signal and convert the pixel signal VO into the digital signal OD.

Referring to FIG. 8, the digital signal OD which is output from the readout circuit 150 for each sensing cycle 1H may include digital image data DID and conversion gain information GI.

The digital image data DID may be, for example, data generated on the basis of a difference between the image signal of the pixel PX and the reset signal of the pixel PX, and the conversion gain information GI may be information indicating whether the digital image data DID is data generated with a low conversion gain or data generated with a high conversion gain.

The digital signal OD thus generated may be provided to the image processor 900 outside the image sensor 100 in the form of an image signal (IMS of FIG. 1). The image processor 900 may determine the necessary processing for the digital image data DID on the basis of the conversion gain information GI and execute the processing.

Figure 9:
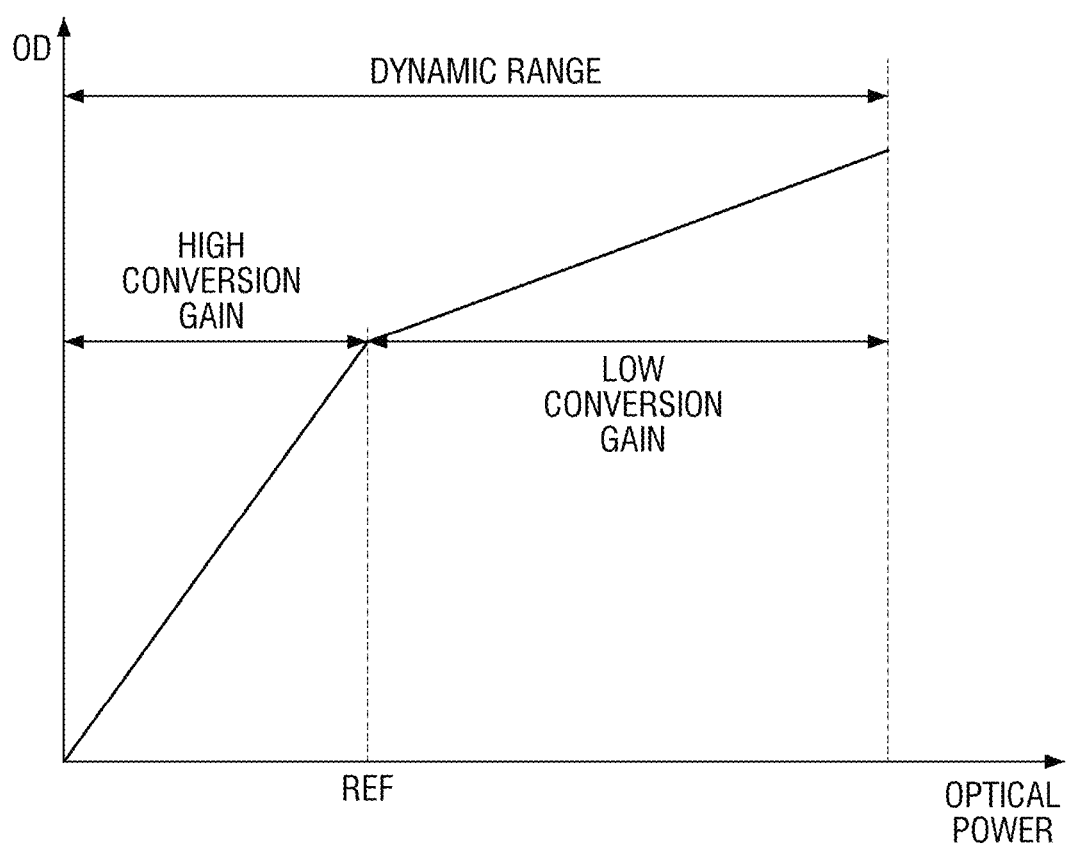
FIG. 9 is a diagram for explaining the effect of the image sensing device according to some example embodiments.

FIG. 9 is a diagram for explaining the effect of the image sensing device according to some example embodiments.

Referring to FIGS. 8 and 9, in the image sensing device according to the present example embodiments, by comparing the optical power of the sensed image with the ramp reference voltage REF within one sensing cycle 1H in which the selection signal SEL maintains the level H, digital signals OD may be generated in gain modes different from each other.

If the optical power of the sensed image is lower than the ramp reference voltage REF, since the optical efficiency is more important than the dynamic range, the digital signal OD is generated with a high conversion gain to maximize the sensing efficiency. Conversely, if the optical power of the sensed image is higher than the ramp reference voltage REF, a digital signal OD is generated with a low conversion gain to maximize the dynamic range.

In some example embodiments, the high conversion gain or the low conversion gain is not determined on the basis of the image of the previous frame or the image signal of the other sensing cycle, both an operation of determining the high conversion gain or the low conversion gain and an operation of generating the digital signal OD are performed within one sensing cycle 1H. Therefore, a high speed operation of the image sensor is enabled.

Hereinafter, an image sensing device according to some example embodiments will be described with reference to FIGS. 10 and 11. Hereinafter, a description of the same configurations as those of the above-described example embodiments will be omitted, and the differences will be mainly described.

Figure 10:
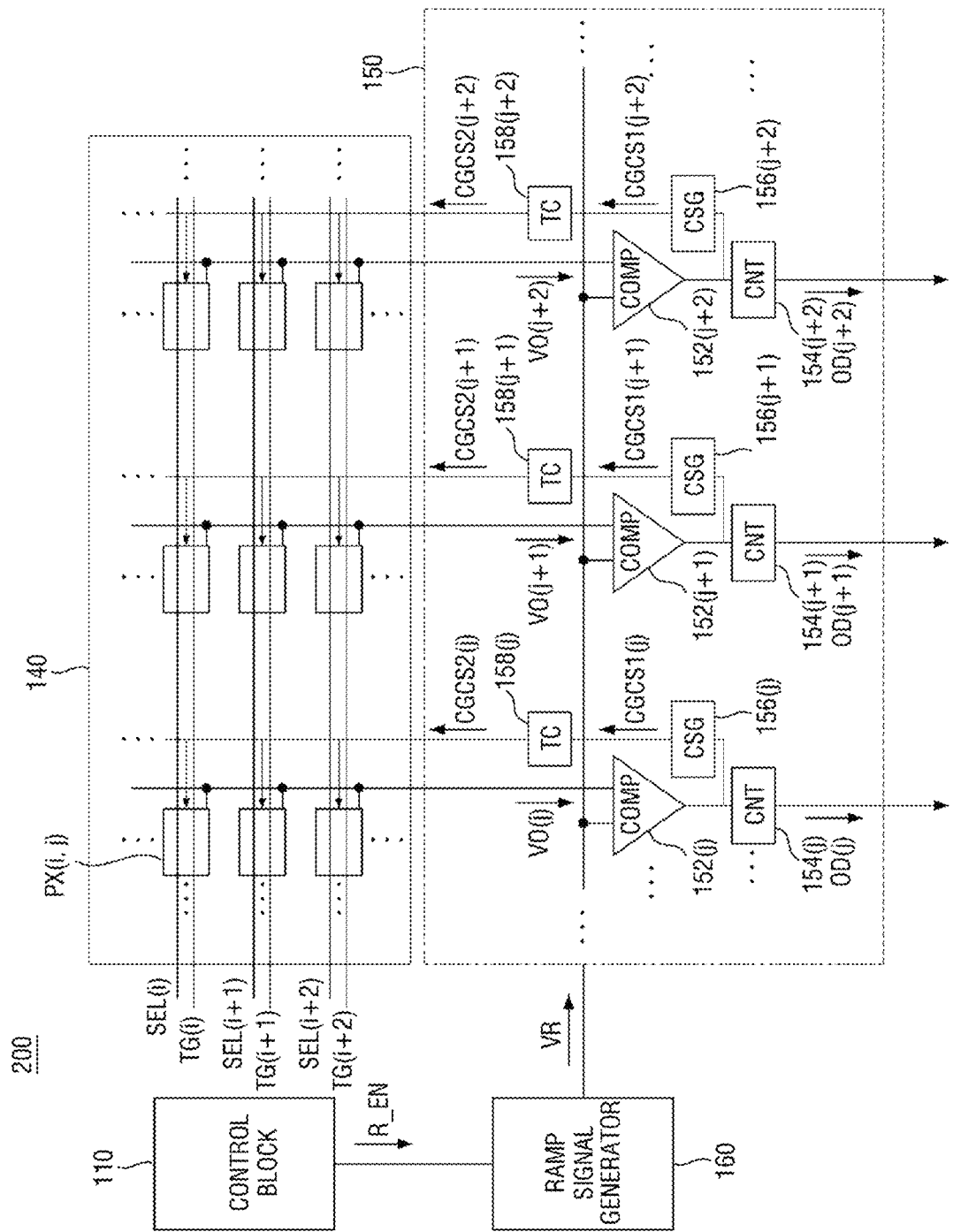
FIG. 10 is a block diagram of an image sensing device according to some example embodiments.

FIG. 10 is a block diagram of an image sensing device according to some example embodiments. FIG. 11 is an example circuit diagram of a timing controller of FIG. 10.

Referring to FIG. 10, a readout circuit 150 of the image sensor 200 may further include timing controllers 158(j), 158(j+1), and 158(j+2).

The timing controllers 158(j), 158(j+1), and 158(j+2) are provided with first gain control signals CGCS1(j), CGCS1(j+1), and CGCS1(j+2) from the control signal generators 156(j), 156(j+1), and 156(j+2), and may provide the second gain control signals CGCS2(j) and CGCS2(j+1), and CGCS2(j+2) to the DCG transistor (GT of FIG. 5). The DCG transistor (GT of FIG. 5) may be turned on or off, depending on the signal levels of the second gain control signals CGCS2(j), CGCS2(j+1), and CGCS2(j+2).

The timing controllers 158(j), 158(j+1), and 158(j+2) may adjust the timing of the first gain control signals CGCS1(j), CGCS1(j+1), and CGCS1(j+2) generated by the control signal generators 156(j), 156(j+1), and 156(j+2), and provide them to the DCG transistor (GT of FIG. 5) in the form of second gain control signals CGCS2(j), CGCS2(j+1), and CGCS2(j+2). That is, the first gain control signals CGCS1 (j), CGCS1(j+1), and CGCS1(j+2), and the second gain control signals CGCS2(j), CGCS2(j+1), and CGCS2(j+2) have the same signal level as each other, but transition timings of the signal may be different from each other.

Such timing controllers 158(j), 158(j+1), and 158(j+2) may be implemented in various forms. Hereinafter, an example of the timing controllers 158(j), 158(j+1), and 158(j+2) will be described with reference to FIG. 11.

Figure 11:
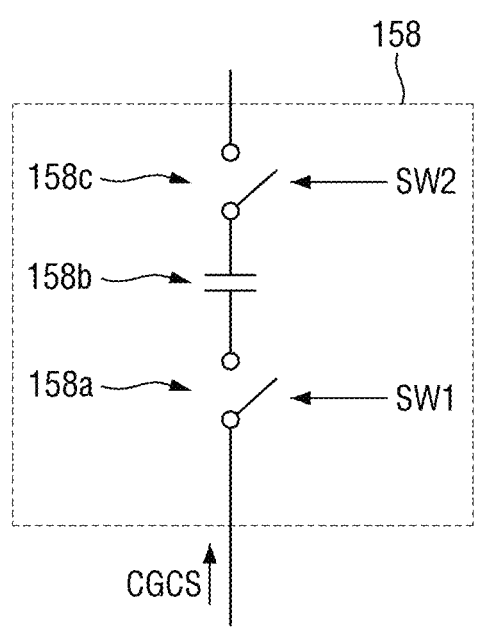
FIG. 11 is an example circuit diagram of a timing controller of FIG. 10.

Referring to FIG. 11, the timing controller 158 may include a first switch 158a, a storage unit 158b (e.g., capacitor), and a second switch 158c.

The first switch 158a is controlled by the first switch signal SW1, and when the first switch 158a is turned on, for example, the gain control signal CGCS provided from the control signal generator 156 may be stored in the storage unit 158b.

The second switch 158c is controlled by the second switch signal SW2, and when the second switch 158c is turned on, the gain control signal CGCS stored in the storage unit 158b may be provided to, for example, the DCG transistor (GT of FIG. 5).

Accordingly, the gain control signal CGCS provided to the timing controller 158 may be provided to the outside after the timing thereof is adjusted (e.g., delayed).

Figure 12:
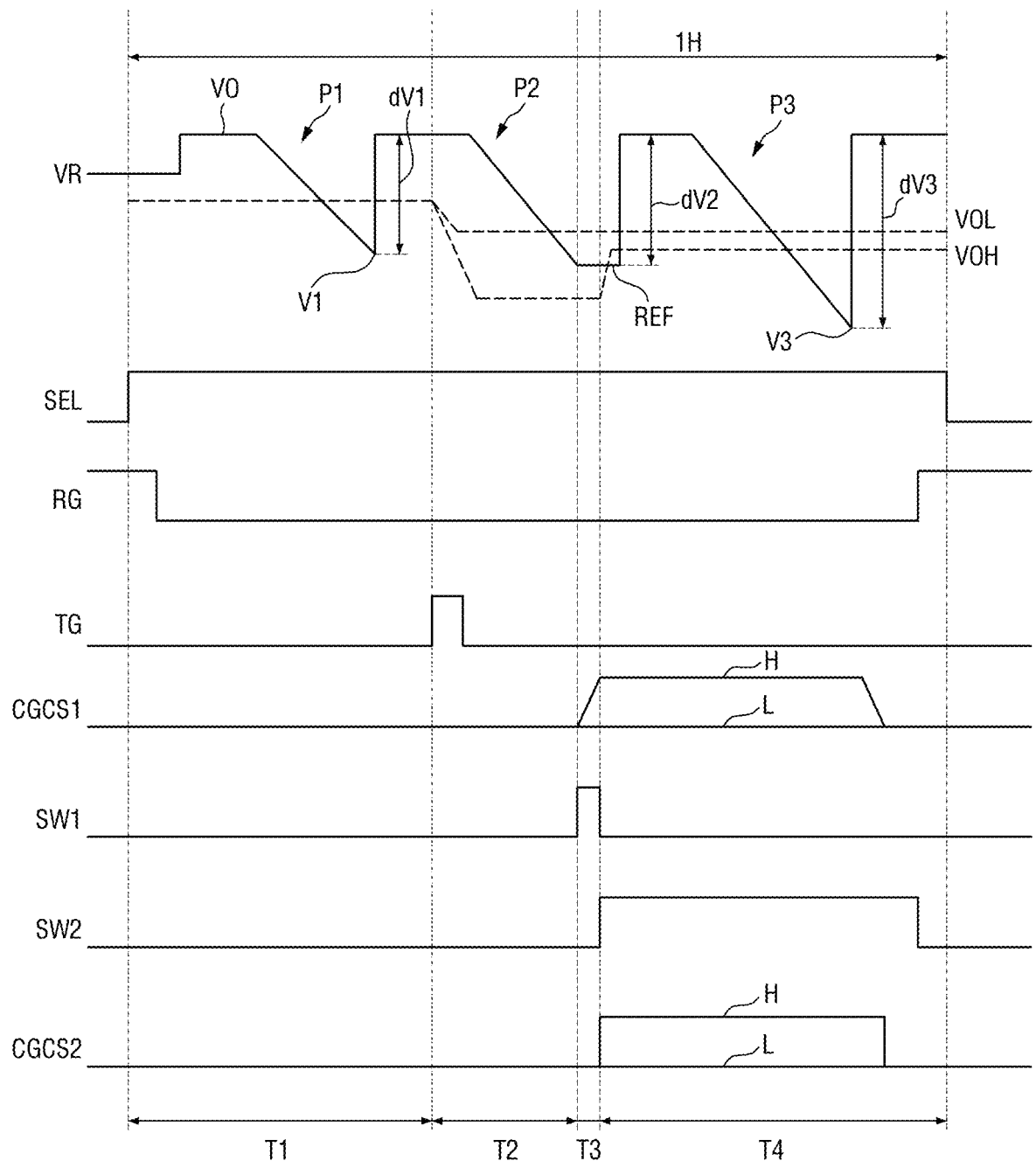
FIG. 12 is a timing diagram for explaining the operation of the image sensing device according to some example embodiments.

FIG. 12 is a timing diagram for explaining the operation of the image sensing device according to some example embodiments. Hereinafter, the description of the same operation as that of the described example embodiments will be omitted, and differences will be mainly described.

Referring to FIGS. 10 to 12, while the control signal generator 156 generates the first gain control signal CGCS1 in the third section T3, the first switch signal SW1 transitions to the level H, and the second switch signal SW2 maintains the level L. Accordingly, the first gain control signal CGCS1 may be stored in the storage unit 158b of the timing controller 158. At this time, since the second switch 158c is in the turned-off state, the first gain control signal CGCS1 is not provided to the DCG transistor (GT of FIG. 5).

Next, the first switch signal SW1 transitions to the level L and the second switch signal SW2 transitions to the level H. As a result, the first gain control signal CGCS1 stored in the storage unit 158b of the timing controller 158 is provided to the DCG transistor (GT of FIG. 5) as the second gain control signal CGCS2.

In this way, by separating the timing at which the gain control signal CGCS is generated and the timing at which the gain control signal CGCS is provided to the DCG transistor (GT of FIG. 5) from each other, it is possible to reduce or prevent a negative feedback due to the readout circuit 150 from occurring in the pixel PX.

Although an example in which the unit sensing unit that generates and outputs the pixel signal corresponds to a single pixel in the image sensor PX has been described above, example embodiments are not limited thereto. The inventive concepts may be implemented in a form in which the unit sensing unit of the image sensor corresponds to a plurality of pixels PX unlike this. Hereinafter, some example embodiments will be described, but example embodiments are not limited to the following examples.

Figure 13:
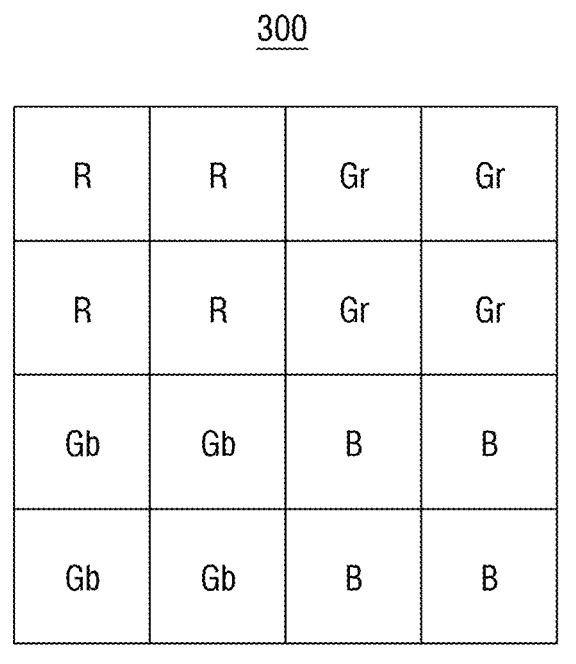

FIG. 13 is an example diagram for explaining a pixel array of an image sensing device according to example embodiments.

Referring to FIG. 13, the pixel array of the image sensor 300 may be configured in a tetra pattern. Although the tetra pattern of FIG. 13 is shown as having only sixteen filters of four rows and four columns, this shows only a part of the filter region for convenience, and example embodiments are not limited thereto. That is, the number of filters of the tetra pattern may be differently applied as much as possible.

The tetra pattern may include filters of three colors of Red, Green, and Blue. That is, the R filter (R) may be an optical filter that transmits only red, the G filters (Gr and Gb) may be optical filters that transmit only green, and the B filter (B) may be an optical filter that transmits only blue.

In the tetra pattern, as shown in FIG. 13, each of R, G, and B filters R, Gb, Gr, and B may be arranged with a certain pattern. Considering human visual characteristics, the G filter may include a Gr filter (Gr) located next to the R filter (R), and a GB filter (B) located next to the B filter (B), as shown in FIG. 13.

A tetra pattern may be formed, by forming a unit sensing unit in which each of the color filters (for example, each of R, Gr, Gb, or B) is configured in a 2×2 matrix. In the tetra pattern, since the respective same color filters (for example, R, Gr, Gb, or B) are adjacent to each other, a spatial similarity may increase. As a result, it is possible to effectively reduce, for example, noise associated with execution of binning.

Figure 14:
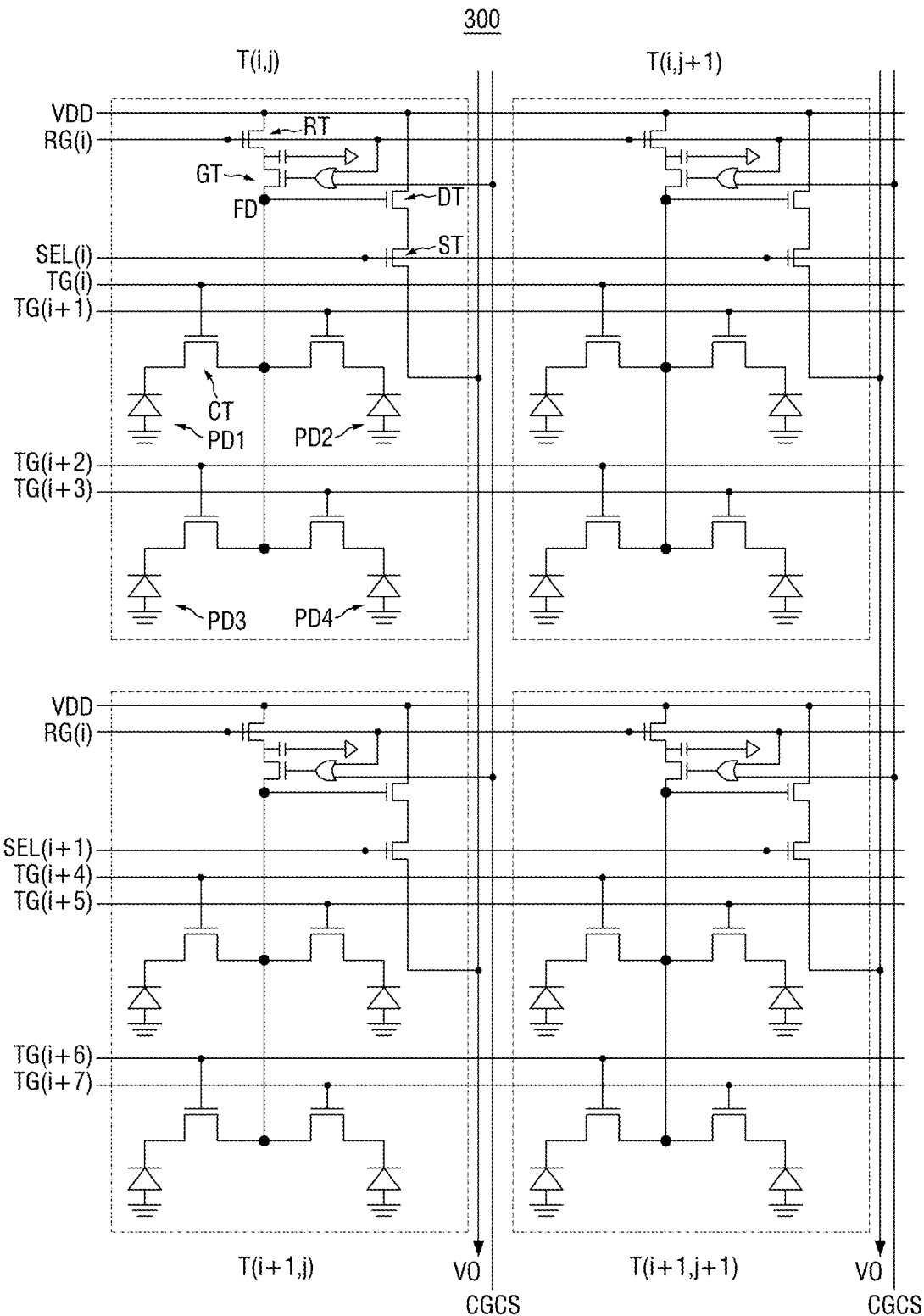
FIG. 14 is a circuit diagram showing a pixel circuit of an image sensing device according to example embodiments.

FIG. 14 is a circuit diagram showing a pixel circuit of an image sensing device according to example embodiments.

Referring to FIG. 14, in the tetra pattern described with reference to FIG. 13, for example, four photoelectric elements PD1, PD2, PD3, and PD4 may share one floating diffusion FD. Further, as shown, the four photoelectric elements PD1, PD2, PD3, and PD4 may also share the reset transistor RT, the drive transistor DT and the selection transistor ST.

When the transmission signal TG(i) becomes a level H, the electric charge transfer transistor TG is turned on, and the photoelectric element PD1 may be connected to the floating diffusion FD. When the transmission signal TG(i+1) becomes a level H, the electric charge transfer transistor TG is turned on, and the photoelectric element PD2 may be connected to the floating diffusion FD. When the transmission signal TG(i+2) becomes a level H, the electric charge transfer transistor TG is turned on, and the photoelectric element PD3 may be connected to the floating diffusion FD. When the transmission signal TG(i+3) becomes a level H, the electric charge transfer transistor TG is turned on, and the photoelectric element PD4 may be connected to the floating diffusion FD.

By adjusting the timing of the transmission signals TG(i), TG(i+1), TG(i+2), and TG(i+4), the conversion gain mode is determined for each unit sensing unit including the four photoelectric elements PD1, PD2, PD3, and PD4, and image data according to the determined conversion gain mode may be generated.

On the other hand, unlike example embodiments explained above, the sensor array of the image sensor may be implemented by being modified so that N*N (N is a natural number of 3 or more) pixels form the unit sensing unit having the same color filters, and independent image signals are generated for each unit sensing unit.

Figure 15:
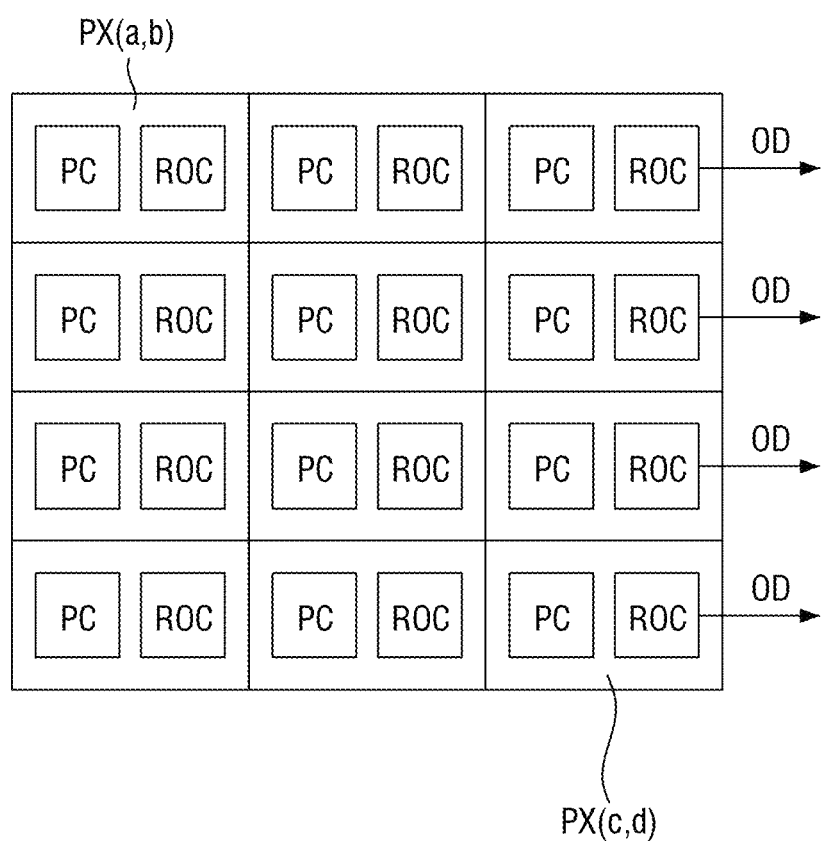
FIG. 15 is an example diagram for explaining a pixel array of an image sensing device according to example embodiments.

FIG. 15 is an example diagram for explaining a pixel array of an image sensing device according to example embodiments. Hereinafter, differences from the above-described embodiments will be mainly described.

Referring to FIG. 15, a pixel circuit PC and a readout circuit ROC may be placed in each pixel of the image sensor 400.

Here, the pixel circuit PC placed in each pixel may include, for example, the pixel circuit PX shown in FIG. 5, and the read-out circuit ROC may include the comparator circuit 152, the counter 154 and the control signal generator 156 shown in FIG. 6. Also, in some example embodiments, the readout circuit ROC may include a comparator 152, a counter 154, a control signal generator 156 and a timing controller 158 shown in FIG. 10.

In some example embodiments, since the readout circuit ROC is placed in each pixel, each pixel may output a digital signal OD other than an analog signal. At this time, the digital signal OD which is output from each pixel may include conversion gain information (GI of FIG. 8) corresponding to the digital image data (DID of FIG. 8) sensed by each pixel. As a result, the digital signal OD which is output from each pixel may include different types of conversion gain information (GI of FIG. 8) from each other.

For example, when sensing an image of one frame, a pixel PX(a,b) may output a digital signal OD including conversion gain information (GI of FIG. 8) corresponding to the low conversion gain, and the digital image data (DID of FIG. 8) sensed with the low conversion gain, and the pixel PX(c,d) may output a digital signal OD including the conversion gain information (GI of FIG. 8) corresponding to the high conversion gain, and the digital image data (DID of FIG. 8) sensed with the high conversion gain.

In some example embodiments, when the image sensor 400 includes an upper substrate and a lower substrate stacked on each other, although the readout circuit ROC included in each pixel may be placed on the lower substrate, example embodiments are not limited thereto.

Figure 16:
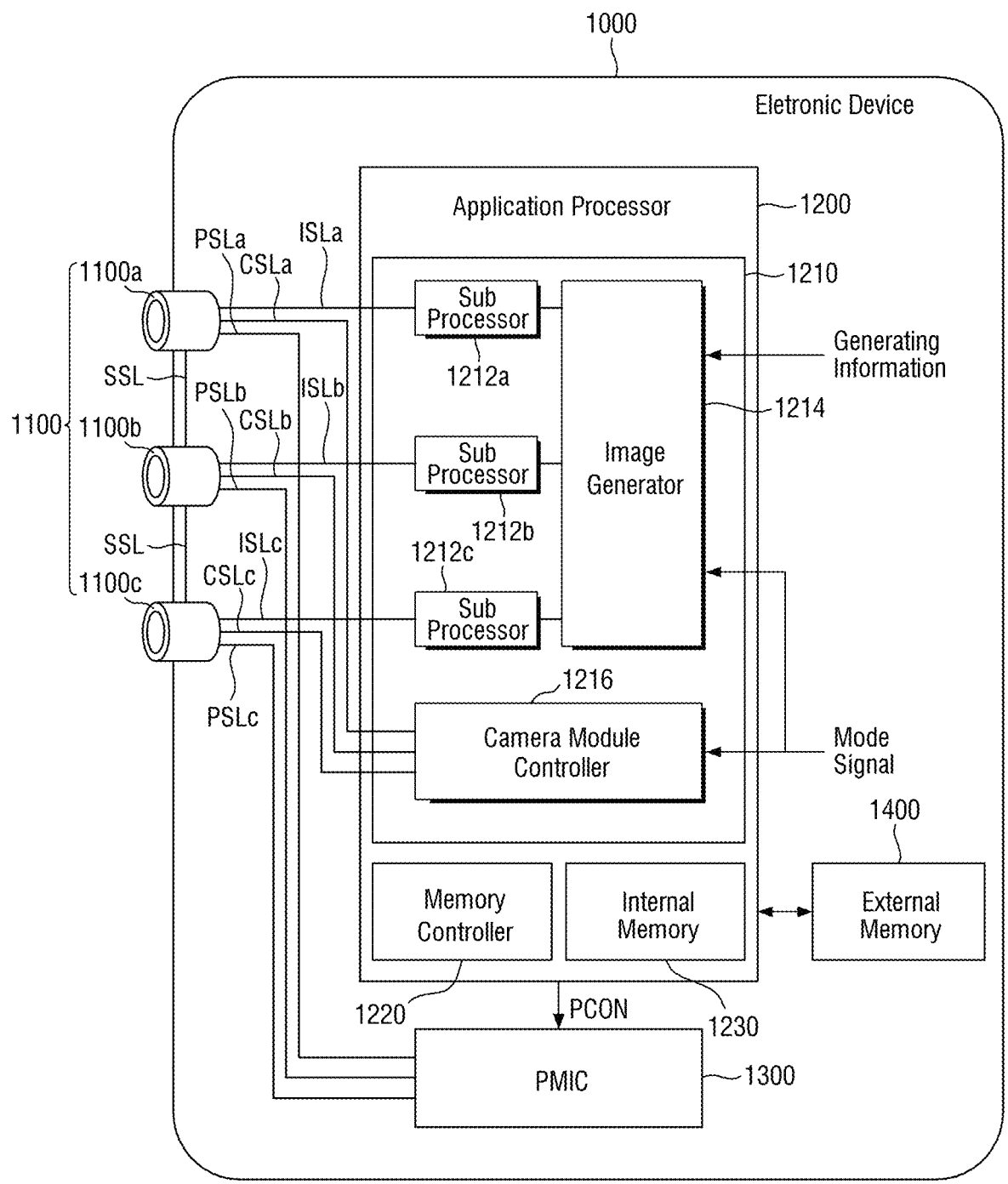
FIG. 16 is a block diagram of an electronic device including a multi-camera module.
Figure 17:
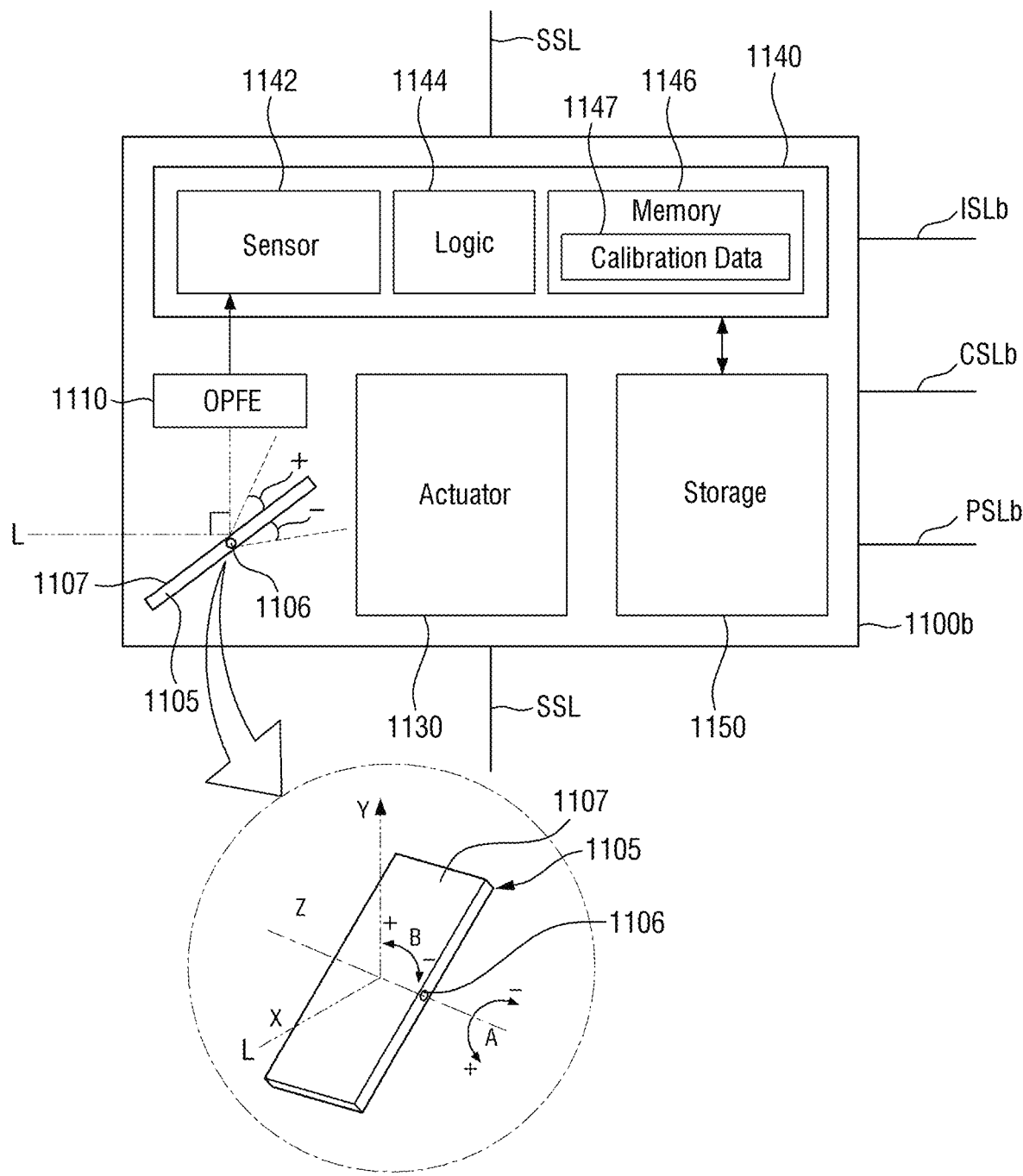
FIG. 17 is a detailed block diagram of the camera module of FIG. 16.

FIG. 16 is a block diagram of an electronic device including a multi-camera module. FIG. 17 is a detailed block diagram of the camera module of FIG. 16.

Referring to FIG. 16, an electronic device 1000 may include a camera module group 1100, an application processor 1200, a power-management integrated circuit (PMIC) 1300, and an external memory 1400.

The camera module group 1100 may include a plurality of camera modules 1100a, 1100b, and 1100c. Although the drawings show an example in which three camera modules 1100a, 1100b, and 1100c are placed, example embodiments are not limited thereto. In some example embodiments, the camera module group 1100 may be implemented by being modified to include only two camera modules. Also, in some example embodiments, the camera module group 1100 may be implemented by being modified to include n (n is a natural number of 4 or more) camera modules.

Hereinafter, although the detailed configuration of a camera module 1100b will be described more specifically with reference to FIG. 17, the following description may also be similarly applied to other camera modules 1100a and 1100c according to example embodiments.

Referring to FIG. 17, the camera module 1100b may include a prism 1105, an optical path folding element (hereinafter "OPFE") 1110, an actuator 1130, an image sensing device 1140, and a storage unit 1150.

The prism 1105 may deform the path of the light L that is incident from the outside, by including a reflecting surface 1107 of the light reflecting material.

In some example embodiments, the prism 1105 may change the path of light L, which is incident in a first direction X, in a second direction Y perpendicular to the first direction X. Further, the prism 1105 may turn the reflecting surface 1107 of the light reflecting material in an A direction around a central axis 1106 or turn the reflecting surface 1107 in a B direction around the central axis 1106, thereby changing the path of the light L, which is incident in the first direction X, in the vertical second direction Y. At this time, the OPFE 1110 may also move in a third direction Z perpendicular to the first direction X and the second direction Y.

In some example embodiments, as shown, although a maximum rotation angle of the prism 1105 in the A direction may be 15 degrees or less in a positive (+) A direction, and may be greater than 15 degrees in a negative (−) A direction, example embodiments are not limited thereto.

In some example embodiments, the prism 1105 may move about 20 degrees or between 10 and 20 degrees, or between 15 and 20 degrees in the positive (+) or negative (−) B direction. Here, a moving angle may move at the same angle in the positive (+) or negative (−) B direction, or may move at an almost similar angle within a range of about 1 degree.

In some example embodiments, the prism 1105 may move the reflecting surface 1107 of the light reflecting material in a third direction (e.g., the direction Z) parallel to an extension direction of the central axis 1106.

The OPFE 1110 may include, for example, optical lenses including m (where m is a natural number) groups. The m lenses may move in the second direction Y to change an optical zoom ratio of the camera module 1100b. For example, when the basic optical zoom ratio of the camera module 1100b is set as Z, if the m optical lenses included in the OPFE 1110 are moved, the optical zoom ratio of the camera module 1100b may be changed to an optical zoom ratio of 3Z or 5Z, or 5Z or more.

The actuator 1130 may move the OPFE 1110 or an optical lens (hereinafter referred to as an optical lens) to a specific position. For example, the actuator 1130 may adjust the position of the optical lens so that the image sensor 1142 is located at the focal length of the optical lens for accurate sensing.

The image sensing device 1140 may include an image sensor 1142, control logic 1144 and a memory 1146. The image sensor 1142 may sense the image of the sensing target, using the light L provided through the optical lens. In some example embodiments, the image sensor 1142 may include at least one of the aforementioned image sensors 100, 200, 300, and 400.

The control logic 1144 may control the overall operation of the camera module 1100b. For example, the control logic 1144 may control the operation of the camera module 1100b according to the control signal provided through a control signal line CSLb.

The memory 1146 may store information necessary for the operation of the camera module 1100b, such as calibration data 1147. The calibration data 1147 may include information necessary for the camera module 1100b to generate image data, using the light L provided from the outside. The calibration data 1147 may include, for example, information about the degree of rotation, information about the focal length, information about the optical axis described above, and the like. When the camera module 1100b is implemented in the form of a multi-state camera in which the focal length changes depending on the position of the optical lens, the calibration data 1147 may include a focal length value for each position (or for each state) of the optical lens, and information about autofocusing.

The storage unit 1150 may store the image data sensed through the image sensor 1142. The storage unit 1150 may be placed outside the image sensing device 1140, and may be implemented in a form of being stacked with a sensor chip that constitutes the image sensing device 1140. In some example embodiments, although the storage unit 1150 may be implemented as an EEPROM (Electrically Erasable Programmable Read-Only Memory), example embodiments are not limited thereto.

Referring to FIGS. 16 and 17 together, in some example embodiments, each of the plurality of camera modules 1100a, 1100b, and 1100c may include an actuator 1130. Accordingly, each of the plurality of camera modules 1100a, 1100b, and 1100c may include the same or different calibration data 1147 according to the operation of the actuator 1130 included therein.

In some example embodiments, one camera module (e.g., 1100b) of the plurality of camera modules 1100a, 1100b, and 1100c may be a folded lens type camera module including the prism 1105 and the OPFE 1110 as described above, and remaining camera modules (e.g., 1100a and 1100c) may be a vertical type camera module that does not include the prism 1105 and the OPFE 1110, but example embodiments are not limited thereto.

In some example embodiments, one camera module (e.g., 1100c) of the plurality of camera modules 1100a, 1100b, and 1100c may be, for example, a vertical type depth camera which extracts depth information, using an IR (Infrared Ray). In some example embodiments, the application processor 1200 may merge the image data provided from such a depth camera with the image data provided from other camera module (e.g., 1100a or 1100b) to generate a 3D depth image.

In some example embodiments, at least two camera modules (e.g., 1100a, 1100b) of the plurality of camera modules 1100a, 1100b, and 1100c may have fields of view different from each other. In some example embodiments, although the optical lenses of at least two camera modules (e.g., 1100a, 1100b) of the plurality of camera modules 1100a, 1100b, and 1100c may be different from each other, example embodiments are not limited thereto.

Also, in some example embodiments, each of the plurality of camera modules 1100a, 1100b, and 1100c may have fields of view different from each other. In some example embodiments, the optical lenses included in each of the plurality of camera modules 1100a, 1100b, and 1100c may also be different from each other, but example embodiments are not limited thereto.

In some example embodiments, each of the plurality of camera modules 1100a, 1100b, and 1100c may be placed to be physically separated from each other. That is, the plurality of camera modules 1100a, 1100b, and 1100c does not dividedly use the sensing region of one image sensor 1142, but an independent image sensor 1142 may be placed inside each of the a plurality of camera modules 1100a, 1100b, and 1100c.

Referring to FIG. 16 again, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented dividedly with separate semiconductor chips.

The image processing device 1210 may include a plurality of sub-image processors 1212a, 1212b, and 1212c, an image generator 1214, and a camera module controller 1216.

The image processing device 1210 may include a plurality of sub-image processors 1212a, 1212b, and 1212c corresponding to the number of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc separated from each other. For example, the image data generated from the camera module 1100a may be provided to the sub-image processor 1212a through the image signal line ISLa, the image data generated from the camera module 1100b may be provided to the sub-image processor 1212b through the image signal line ISLb, and the image data generated from the camera module 1100c may be provided to the sub-image processor 1212c through the image signal line ISLc. Although such an image data transmission may be executed using, for example, a camera serial interface (CSI) based on a MIPI (Mobile Industry Processor Interface), example embodiments are not limited thereto.

In some example embodiments, the image data generated from each of the camera modules 1100a, 1100b, and 1100c may include the conversion gain information (GI of FIG. 8) for each unit sensing unit described above. Such conversion gain information (GI of FIG. 8) may be provided to the sub-image processors 1212a, 1212b, and 1212c or the image generator 1214 and used for image processing.

In some example embodiments, each of the camera modules 1100a, 1100b, and 1100c may generate first and second image signals that form one frame image, provide a first image signal including first conversion gain information to the sub-image processors 1212a, 1212b, and 1212c or the image generator 1214, and provide the second image signal including the second conversion gain information different from the first conversion gain information to the sub-image processors 1212a, 1212b, and 1212c, or the image generator 1214. That is, the first and second image signals forming one frame image may include different types of conversion gain information from each other.

The sub-image processors 1212a, 1212b, and 1212c or the image generator 1214 may perform the first image processing, using the first conversion gain information included in the first image signal, and may perform the second image processing, using the second conversion gain information included in the second image signal.

Meanwhile, in some example embodiments, one sub-image processor may be placed to correspond to a plurality of camera modules. For example, the sub-image processor 1212a and the sub-image processor 1212c are not separately implemented as shown, but may be merged and implemented as one sub-image processor, and the image data provided from a camera module 1100a and a camera module 1100c may be provided to the merged sub-image processor after being selected through the selection element (e.g., a multiplexer).

The image data provided to the respective sub-image processors 1212a, 1212b, and 1212c may be provided to the image generator 1214. The image generator 1214 may generate the output image, using the image data provided from each of the sub-image processors 1212a, 1212b, and 1212c according to the image generating information or the mode signal.

Specifically, the image generator 1214 may merge at least some of the image data generated from the camera modules 1100a, 1100b, and 1100c having different fields of view to generate an output image, according to the image generating information or the mode signal. In addition, the image generator 1214 may select any one of the image data generated from the camera modules 1100a, 1100b, and 1100c having different fields of view to generate an output image, according to the image generating information or the mode signal.

In some example embodiments, the image generating information may include a zoom signal (or zoom factor). Also, in some example embodiments, the mode signal may be, for example, a signal based on a mode selected from a user.

When the image generating information is a zoom signal (zoom factor) and each of the camera modules 1100a, 1100b, and 1100c has fields of view (viewing angles) different from each other, the image generator 1214 may perform different operations from each other, depending on the type of zoom signal. For example, when the zoom signal is the first signal, after the image data output from the camera module 1100a and the image data output from the camera module 1100c are merged, an output image may be generated, using the merged image signal, and the image data that is output from the camera module 1100b which is not used for merging. If the zoom signal is the second signal that is different from the first signal, the image generator 1214 does not merge the image data, and may select any one of the image data output from each of the camera modules 1100a, 1100b, and 1100c to generate the output image. However, example embodiments are not limited thereto, and the method of processing the image data may be modified and implemented as needed.

In some example embodiments, the image generator 1214 receives image data of different exposure times from at least one of the plurality of sub-image processors 1212a, 1212b, and 1212c, and performs a HDR (high dynamic range) processing on the plurality of image data, thereby generating the merged image data with an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through the control signal lines CSLa, CSLb, and CSLc separated from each other.

Any one of the plurality of camera modules 1100a, 1100b, and 1100c is designated as a master camera (e.g., 1100b) according to the image generating information including a zoom signal, or a mode signal, and the remaining camera modules (e.g., 1100a and 1100c) may be designated as slave cameras. Such information is included in the control signal, and may be provided to the corresponding camera modules 1100a, 1100b, and 1100c through the control signal lines CSLa, CSLb, and CSLc separated from each other.

Depending on the zoom factor or the operation mode signal, the camera modules operating as the master and slave may be changed. For example, when the viewing angle of the camera module 1100a is wider than that of the camera module 1100b, and the zoom factor shows a low zoom ratio, the camera module 1100b may operate as a master, and the camera module 1100a may operate as a slave. Conversely, when the zoom factor shows a high zoom ratio, the camera module 1100a may operate as a master and the camera module 1100b may operate as a slave.

In some example embodiments, the control signals provided from the camera module controller 1216 to the respective camera modules 1100a, 1100b, and 1100c may include sync enable signals. For example, when the camera module 1100b is a master camera and the camera modules 1100a and 1100c are slave cameras, the camera module controller 1216 may transmit the sync enable signal to the camera module 1100b. The camera module 1100b provided with such a sync enable signal generates a sync signal on the basis of the provided sync enable signal, and may provide the generated sync signal to the camera modules 1100a and 1100c through the sync signal line SSL. The camera module 1100b and the camera modules 1100a and 1100c may transmit the image data to the application processor 1200 in synchronization with such a sync signal.

In some example embodiments, the control signal provided from the camera module controller 1216 to the plurality of camera modules 1100a, 1100b, and 1100c may include mode information according to the mode signal. On the basis of the mode information, the plurality of camera modules 1100a, 1100b, and 1100c may operate in the first operation mode and the second operation mode in relation to the sensing speed.

The plurality of camera modules 1100a, 1100b, and 1100c generates an image signal at a first speed (for example, generates an image signal of a first frame rate) in the first operation mode, encodes the image signal at a second speed higher than the first speed (e.g., encodes an image signal of a second frame rate higher than the first frame rate), and may transmit the encoded image signal to the application processor 1200. At this time, the second speed may be equal to or less than 30 times the first speed.

The application processor 1200 stores the received image signal, that is to say, the encoded image signal, in the memory 1230 provided inside or the storage 1400 outside the application processor 1200. Thereafter, the application processor 1200 may read and decode the encoded image signal from the memory 1230 or the storage 1400, and may display the image data generated on the basis of the decoded image signal. For example, the corresponding sub-processors of the plurality of sub-processors 1212a, 1212b, and 1212c of the image processing device 1210 may perform decoding, and may perform the image processing on the decoded image signal.

In the second operation mode, the plurality of camera modules 1100a, 1100b, and 1100c generates an image signal at a third speed lower than the first speed (for example, generates an image signal of a third frame rate lower than the first frame rate), and may transmit the image signal to the application processor 1200. The image signal provided to the application processor 1200 may be a non-encoded signal. The application processor 1200 may perform the image processing on the received image signal or store the image signal in the memory 1230 or the storage 1400.

The PMIC 1300 may supply a power, for example, a power supply, to each of the plurality of camera modules 1100a, 1100b, and 1100c. For example, under the control of the application processor 1200, the PMIC 1300 may supply a first power to the camera module 1100*a* through a power signal line PSLa, supply a second power to the camera module 1100*b* through a power signal line PSLb, and supply a third power to the camera module 1100*c* through a power signal line PSLc.

The PMIC 1300 responds to a power control signal PCON from the application processor 1200 to generate power corresponding to each of the plurality of camera modules 1100*a*, 1100*b*, and 1100*c*, and may adjust the level of the power. The power control signal PCON may include a power adjustment signal for each operation mode of the plurality of camera modules 1100*a*, 1100*b*, and 1100*c*. For example, the operation mode may include a low power mode, and at this time, the power control signal PCON may include information on the camera module operating in the low power mode and the power level to be set. The levels of powers supplied to each of the plurality of camera modules 1100*a*, 1100*b*, and 1100*c* may be the same as or different from each other. Also, the level of power may be changed dynamically.

In example embodiments, features of the image sensor 100 (e.g., control block 110, timing generator 120, row driver 130, ramp signal generator 160) and/or image processor 900 in FIGS. 1 and/or 6, electronic device 1000 (e.g., application processor 1200, sub-processors 1212*a* to 1212*c* and camera module controller 1216 of the image processing device 1210, memory controller 1220, internal memory 1230, actuator 1130, logic 1144, sensor 1142, memory 1146, etc.) in FIGS. 16-17 may include processing circuitry such as hardware including logic circuits; a hardware/software combination such as a processor executing software; memory; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The memory may include a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM), STT-MRAM (spin transfer torque magnetic random access memory), but example embodiments are not limited thereto.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. An image sensing device comprising:
a pixel circuit including a floating diffusion, a photoelectric element, a drive transistor, a DCG (Dual Conversion Gain) transistor, a selection transistor, a column line connected to the selection transistor,
the floating diffusion being a region of the pixel circuit,
the floating diffusion being configured to store an electric charge generated by the photoelectric element,
the drive transistor being configured to generate a pixel signal based on the electric charge stored in the floating diffusion,
the selection transistor being configured to output the pixel signal generated by the drive transistor to the column line in response to the selection transistor receiving a selection signal,
the selection transistor being configured to output a first pixel signal to the column line based on the electric charge stored in the floating diffusion in a state in which the DCG transistor is turned off,
the DCG transistor being configured to change a capacitance of the floating diffusion in response to the DCG transistor receiving a gain control signal, and
the pixel circuit being configured to perform an operation of the selection transistor outputting the first pixel signal to the column line and the DCG transistor receiving the gain control signal while the selection transistor receives the selection signal maintained at a first level; and
processing circuitry configured to determine the gain control signal using a result of a comparison between the first pixel signal and a ramp signal during one sensing cycle.

2. The image sensing device of claim 1, wherein
the pixel circuit further includes a reset transistor and a capacitor,
the reset transistor is configured to provide a reset voltage to the floating diffusion in response to a reset signal,
the capacitor connected between the reset transistor and the DCG transistor, and
the DCG transistor is configured to change the capacitance of the floating diffusion using the capacitor.

3. The image sensing device of claim 2, wherein a capacitance of the capacitor is greater than the capacitance of the floating diffusion.

4. The image sensing device of claim 2, wherein the reset transistor and the DCG transistor are configured to be simultaneously turned on in response the reset signal.

5. The image sensing device of claim 1, wherein
the pixel circuit further includes an electric charge transfer transistor configured to provide electric charge generated by the photoelectric element to the floating diffusion in response to a transmission signal,
the photoelectric element includes a first photoelectric element, a second photoelectric element, a third photoelectric element, and a fourth photoelectric element separated from each other, and
the electric charge transfer transistor includes a first charge transfer transistor, a second charge transfer transistor, a third charge transfer transistor, and a fourth charge transfer transistor,
the first charge transfer transistor is connected to the first photoelectric element and the floating diffusion,
the second charge transfer transistor is connected to the second photoelectric element and the floating diffusion,
the third charge transfer transistor is connected to the third photoelectric element and the floating diffusion, and
the fourth charge transfer transistor is connected to the fourth photoelectric element and the floating diffusion.

6. An image sensing device comprising:
a pixel circuit including a floating diffusion, a photoelectric element, a drive transistor, a DCG (Dual Conversion Gain) transistor, a selection transistor, a column line connected to the selection transistor,
the floating diffusion being a region of the pixel circuit,
the floating diffusion being configured to store an electric charge generated by the photoelectric element,
the drive transistor being configured to generate a pixel signal based on the electric charge stored in the floating diffusion, the selection transistor being configured to output the
pixel signal generated by the drive transistor to the
column line in response to the selection transistor
receiving a selection signal, the selection transistor being configured to output a first
pixel signal to the column line based on the electric
charge stored in the floating diffusion in a state in which
the DCG transistor is turned off, the DCG transistor being configured to change a capacitance of the floating diffusion in response to the DCG
transistor receiving a gain control signal, and the pixel circuit being configured to perform an operation
of the selection transistor outputting the first pixel
signal to the column line and the DCG transistor
receiving, the gain control signal while the selection
transistor receives the selection signal maintained at a
first level, wherein the pixel circuit further includes a reset transistor and a
capacitor, the reset transistor is configured to provide a reset voltage
to the floating diffusion in response to a reset signal, the capacitor is connected between the reset transistor and
the DCG transistor, the DCG transistor is configured to change the capacitance of the floating diffusion using the capacitor, the pixel circuit further includes an OR gate, and the OR gate is configured to receive the gain control
signal and the reset signal, perform an OR calculation
based on the gain control signal and the reset signal,
and provide a result of the OR calculation to the DCG
transistor.

7. An image sensing device comprising:
a pixel circuit configured to output a pixel signal in
response to a selection signal; and
a readout circuit configured to output a digital signal
corresponding to the pixel signal provided from the
pixel circuit,
the readout circuit being configured to receive a first pixel
signal from the pixel circuit, generate a gain control
signal based on the first pixel signal, and provide the
gain control signal to the pixel circuit,
the readout circuit being configured to receive a second
pixel signal output by the pixel circuit using the gain
control signal, and output a digital signal corresponding
to the second pixel signal, and
a row driver configured to provide the selection signal to
the pixel circuit while maintaining the selection signal
at a first level during an operation in which the readout
circuit provides the gain control signal to the pixel
circuit and an operation in which the pixel circuit
outputs the second pixel signal to the readout circuit are
performed.

8. The image sensing device of claim 7, wherein
the readout circuit includes a comparator and a control
signal generator,
the comparator is configured to output a comparison
signal based on a comparison of a ramp signal with the
first pixel signal,
the control signal generator is configured to generate the
gain control signal based on the comparison signal.

9. The image sensing device of claim 8, wherein
the readout circuit further includes a timing controller,
the timing controller is configured to receive a first gain
control signal generated by the control signal generator,
and
the timing controller is configured to provide the pixel
circuit with a second gain control signal generated by
adjusting a timing of the first gain control signal.

10. The image sensing device of claim 9, wherein
the timing controller includes a storage unit, a first switch,
and a second switch,
the storage unit is configured to store the first gain control
signal by turning on the first switch to provide a stored
first gain control signal, and
the timing controller is configured output the stored first
gain control signal as the second gain control signal by
turning on the second switch.

11. The image sensing device of claim 7, wherein
the readout circuit is configured to output the digital
signal corresponding to the second pixel signal and the
digital signal includes conversion gain information
corresponding to the gain control signal generated the
first pixel signal.

12. The image sensing device of claim 11, further comprising:
a pixel array including a plurality of pixels, wherein
the plurality of pixels includes a first pixel and a second
pixel,
the first pixel is configured to output a third pixel signal,
the second pixel is configured to output a fourth pixel
signal,
the third pixel signal and the fourth pixel signal constitute
an image of same frame,
the readout circuit is configured to output a first digital
signal corresponding to the third pixel signal and output
a second digital signal corresponding to the fourth pixel
signal, and
the first digital signal and the second digital signal include
different types of conversion gain information from
each other.

13. The image sensing device of claim 7, further comprising:
a pixel array including a plurality of pixels, wherein
each pixel of the pixel array includes the pixel circuit and
the readout circuit.

* * * * *